United States Patent
Kelly et al.

(10) Patent No.: US 7,162,438 B1
(45) Date of Patent: Jan. 9, 2007

(54) METHOD OF PROVIDING GARDENING/AGRICULTURAL INFORMATION

(75) Inventors: J. Keith Kelly, Newborn, GA (US); Peter Stuart Edmondson, Alpharetta, GA (US)

(73) Assignee: Gardening 123.com, Inc., Covington, GA (US)

( * ) Notice: Subject to any disclaimer, the term of this patent is extended or adjusted under 35 U.S.C. 154(b) by 456 days.

(21) Appl. No.: 09/613,592

(22) Filed: Jul. 10, 2000

Related U.S. Application Data

(63) Continuation-in-part of application No. 09/373,576, filed on Aug. 13, 1999.

(51) Int. Cl.
*G06Q 30/00* (2006.01)

(52) U.S. Cl. ....................................................... 705/26

(58) Field of Classification Search ................. 705/26, 705/27, 9
See application file for complete search history.

(56) References Cited

U.S. PATENT DOCUMENTS

| | | | | |
|---|---|---|---|---|
| 5,726,884 A | * | 3/1998 | Sturgeon et al. ............... | 705/9 |
| 5,974,388 A | * | 10/1999 | Durham .......................... | 705/1 |
| 6,064,979 A | * | 5/2000 | Perkowski ..................... | 705/26 |
| 6,078,928 A | * | 6/2000 | Schnase et al. ................ | 705/7 |

FOREIGN PATENT DOCUMENTS

| | | | |
|---|---|---|---|
| JP | 11296604 A | * | 10/1999 |

OTHER PUBLICATIONS

Gerland Jim and Winer, Mark; Taking a Spade to the Web, Buffalo News; Buffalo, N.Y.; Apr. 7, 1998, pp. 1-2, extracted on Internet on Jan. 15, 2002 from Proquest Database: http://proquest.umi.com.*
Web pages, as existed in Jan. 1999, from http://web.archive.org/web/19990128180853/http://www2.garden.org, pp. 1-2, extracted on Internet on Jan. 16, 2002 from Proquest database: http://proquest.umi.com.*
Gardening.com, http://web.archive.org/web/*/gardening.com <retrieved from Internet on Jan. 31, 2005> WayBackMachine.org—Internet Archiving Program, discloses a plant search database on the Web and reviews quality gardening sites.*
Garden.com, http://www4.garden.com/index.html, note plant finder feature.

* cited by examiner

*Primary Examiner*—Matthew S Gart
(74) *Attorney, Agent, or Firm*—McKenna Long & Aldridge LLP

(57) ABSTRACT

A method and system for supplying gardening/agricultural information and advice uses an inventory of plant life on a user's property to generate a recommended plant maintenance plan. The method and system may be automated by a computer. The recommended maintenance plan includes recommended gardening materials and a schedule of times or time windows during which the materials should best be applied for all of the various plants. Also, specific instructions may be supplied to the user in a timely fashion as to when and how to apply various gardening materials, as well as exactly which gardening materials should be applied, to the various types of plant life on the user's property. If the user so chooses, the recommended materials may be automatically sent to the user at the appropriate times and an account (e.g., credit card) of the user may be automatically debited accordingly.

7 Claims, 29 Drawing Sheets

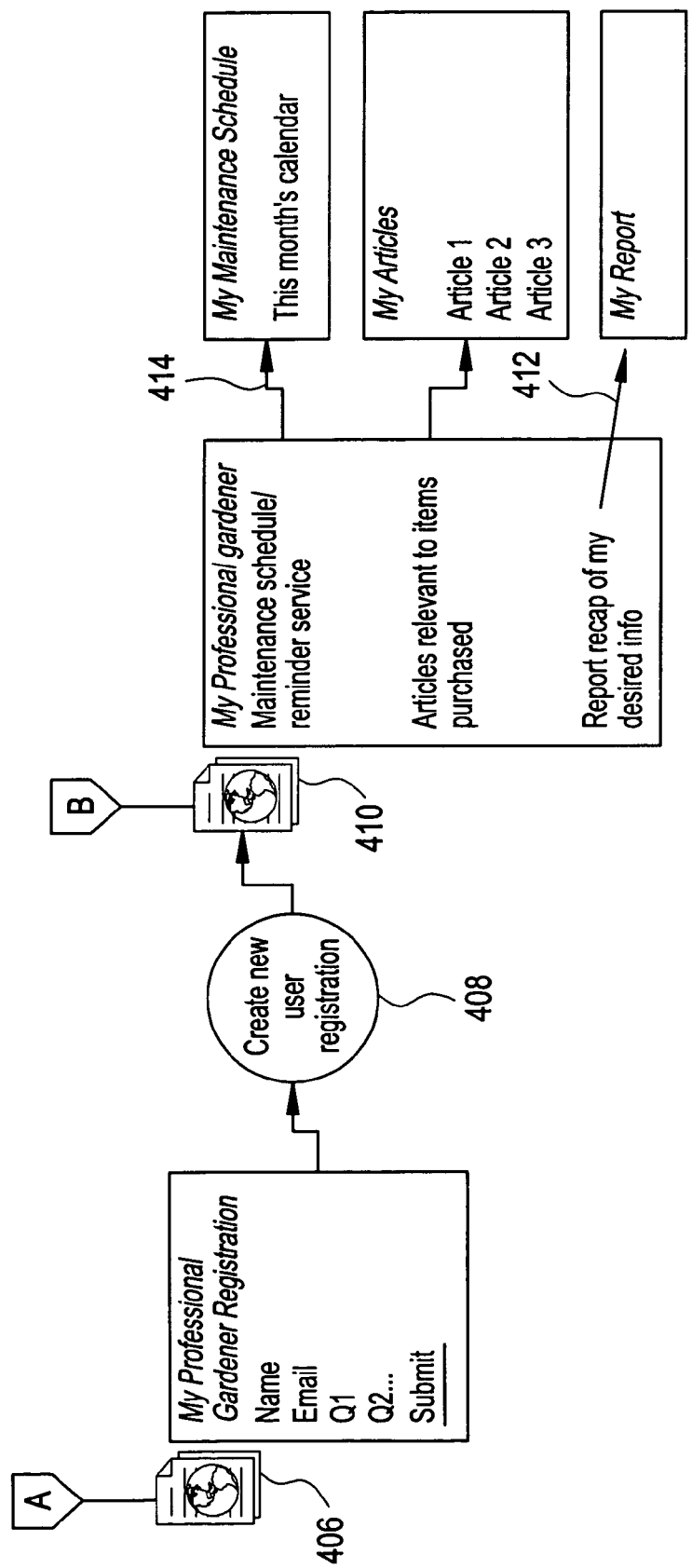

FIG. 5

Design a Garden

*Home page for gardening 123*

| Find a solution | Shopping catalog |
|---|---|
| Plants/Flowers | Pest Control |
| Veggies & Herbs | Plants/Flowers |
| Trees | Shrubs |
| Bulbs | Bulbs |
| Lawn | Fruit |
| Fruits | Vegetables |
| Shrubs | Indoor Plants |
| | Trees |
| My professional gardener | Lawns |

| Login/Password | Home Decorating items |
|---|---|
| Enter Professional Gardener | Tools and accessories |
| | Lawn furniture |
| | Gifts |
| Special Features Glossary | Pet Pest Control |
| | Fertilizer |
| | Pool Chemicals |
| Design a Garden | |
| | Gardening Resources |
| General Articles | |

Design a Garden

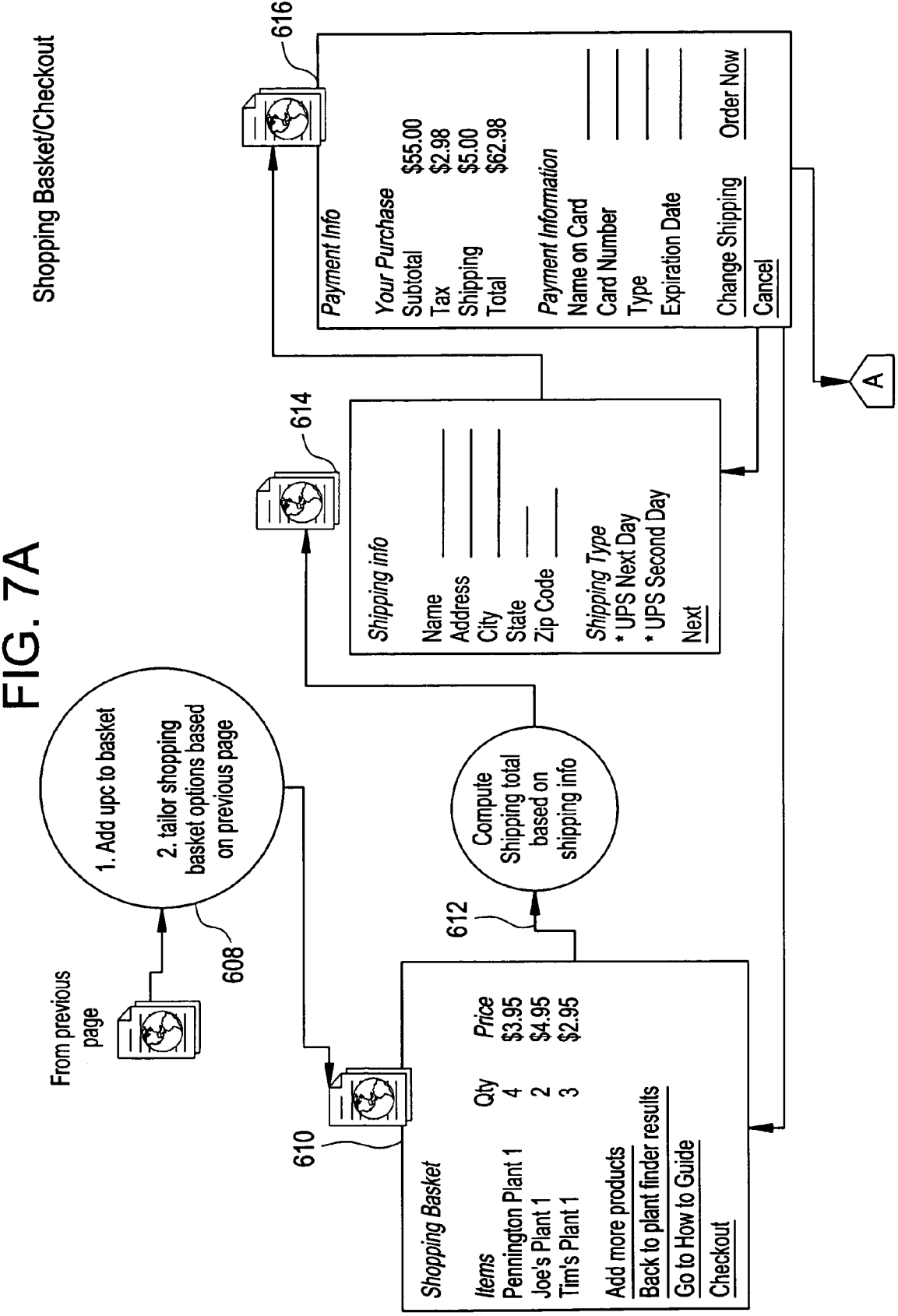
FIG. 7A — Shopping Basket/Checkout

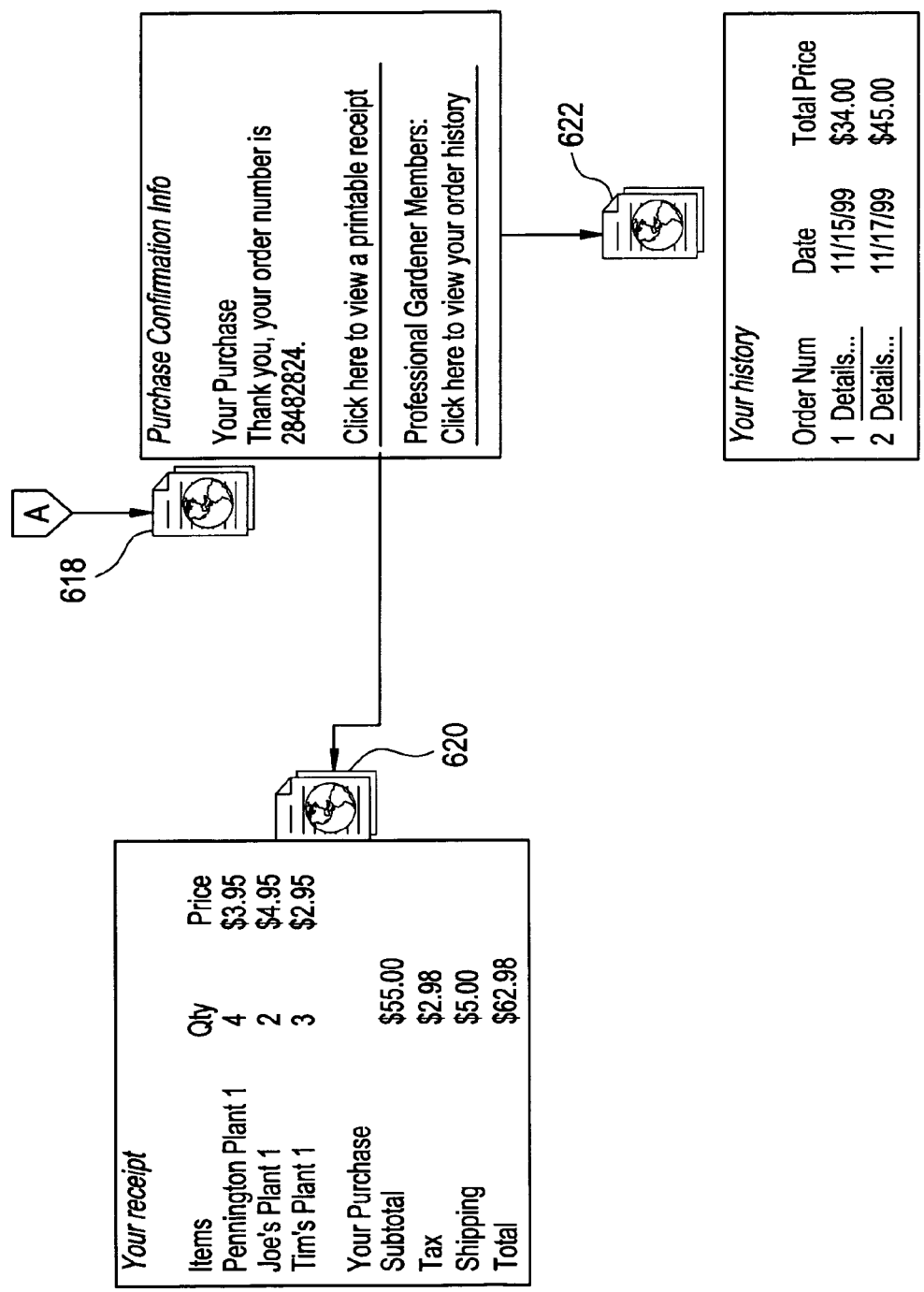

METHOD OF PROVIDING GARDENING/AGRICULTURAL INFORMATION

CROSS REFERENCE TO RELATED APPLICATIONS

This application is a continuation-in-part of U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson, the entirety of which is hereby incorporated by reference for all purposes as if fully set forth herein.

BACKGROUND OF THE INVENTION

1. Field of the Invention

The present invention relates generally to the field of gardening and agriculture and more particularly to a method and system for providing gardening/agricultural information and advice.

2. Description of the Related Art

As used herein, the term "plant" is understood to broadly describe a variety of forms of plant life, including plants, trees, shrubs, grasses, vines, flowers, and the like. There are a wide variety plants which grow in different geographic areas. The variety is tremendous, and many people find it difficult to identify and keep track of all of the various plants which are located on their property. Even if they can keep track of the plant life on their property, it is very difficult for the average person to determine a proper maintenance plan for their property to promote growth of desirable plant life and which eliminate weeds and other undesirable plant life. That is, it is difficult to know what specific agricultural products or gardening materials, such as fertilizers, pesticides, weed killers, seeds, etc., that a person should apply to various plant life growing on their property, and when and in what amount the gardening materials should be applied.

This problem includes several components. First, the person must identify all of the desirable plant life on their property. Second, the person must be aware of and able to identify undesirable plant life (e.g., weeds, fungus) and pests (e.g., insects) which must be controlled. Third, the person must select appropriate gardening materials to apply to various plant life on their property.

This problem is exacerbated by the large selection of available materials, and by the many various forms in which the materials can be applied (e.g., powder, spray, systemic, time-release formula, etc.) for each plant life and particular situation. And it is further complicated by the fact that different gardening materials have different levels of effectiveness in different geographical areas and at different times of the year. Also, some materials may be appropriate for one type of plant life, but may be detrimental to the health of other desirable plant life located on the same property. And some materials which are legal in one state may not be legal in a different state, or they may be legal for different uses in different states.

So, for the average person, this presents a rather complex problem. And the complexity is multiplied by the number of different types of plant life typically found on a particular property.

One solution in the past has been to rely upon the knowledge and advice of a local gardening material supplier. However, this is of limited effectiveness if the supplier has not personally inventoried the plant life on the customer's property. Also, this is a passive solution in that the gardening supplier typically will only answer specific questions from a customer, and does not proactively notify the customer of when to apply gardening products for all of the customer's plants.

Another solution has been for an individual to hire a personal professional gardener or landscape company to tend to the person's property. But this is an expensive solution.

Accordingly, it would be advantageous to provide a method and system for supplying gardening/agricultural information and advice. It would also be advantageous to provide such a method and system which is automated, for example by a computer. It would additionally be advantageous to provide such a method and system which supplies advice tailored to the geographical location of a particular property. It would further be advantageous to provide such a method and system which supplies information and advice tailored to the specific forms of desirable plant growth present on the particular property. It would further be advantageous to provide such a method and system which is accessible ubiquitously to individuals regardless of where they might be located. Other and further objects and advantages will appear hereinafter.

SUMMARY OF THE INVENTION

The present invention comprises a method and system for supplying gardening/agricultural information and advice.

In one aspect of the invention, a user generates an inventory of desired plants (e.g., trees, shrubs, grasses, vines, flowers, etc.) present on the user's property, and identifies a geographical region, including, preferably, a country, state or province, and county where the property is located. In a preferred embodiment, for example, where the property is locate din the United States, the USDA plant hardiness zone for the property is determined. Based on the information supplied by the user, the user receives a recommended maintenance plan for the plant life on the user's property. Preferably, the recommended maintenance plan includes: recommended gardening materials (fertilizers, pesticides, herbicides, etc.); recommended maintenance activities (e.g, planting, pruning); and a recommended maintenance schedule of times or time windows during which the materials should best be applied and when the maintenance activities should be performed. Preferably, specific instructions are then supplied to the user in a timely fashion as to when and how to apply various gardening materials, as well as exactly which gardening materials should be applied, to the various types of plant life on the user's property. Also, reminders may be provided to the user within a few days or a week of when a gardening material should be applied. Further, if a user so chooses, the recommended materials may be automatically sent to the user at the appropriate times and an account (e.g., credit card) of the user may be automatically debited accordingly.

In another aspect of the invention, a method and system for supplying gardening/agricultural information and advice is to automated by a computer. The computer compares an inventory of plant life on the user's property with stored maintenance data for each plant and generates therefrom a maintenance plan for the property. The maintenance plan preferably includes a schedule and recommended products to be applied. The computer-executed algorithms are flexible and adaptable, and may take into consideration a host of additional factors, such as the property's location, pets and pests present on the property, the maintenance history of the property, etc. to generate an optimum maintenance-plan. Preferably the maintenance plan is automatically updated as new information becomes available.

In still another aspect of the invention, a method and system assists the user in identifying the plant life on his property, together with pests or other problems which exist on the property, based on the user's response to a series of queries.

In yet another aspect of the invention, a method and system for supplying automated gardening/agricultural information and advice is provided via the Internet, such that it may be accessed ubiquitously by a user from any place with Internet access.

BRIEF DESCRIPTION OF THE DRAWINGS

FIGS. 4A–4B illustrate a fourth portion of a flowchart of a first preferred embodiment of a method and system for supplying gardening/agricultural information and/or advice;

FIG. 5 is a fifth portion of a flowchart of a first preferred embodiment of a method and system for supplying gardening/agricultural information and/or advice;

FIGS. 7A–7B illustrate a seventh portion of a flowchart of a first preferred embodiment of a method and system for supplying gardening/agricultural information and/or advice;

DESCRIPTION OF THE PREFERRED EMBODIMENTS

The present inventions will be discussed with reference to preferred embodiments of a method in the form of a computer program. Numerous specific details, such as specific user queries, the order of the queries, etc. are set forth in order to provide a thorough understanding of the present invention. The preferred embodiments described herein are for the purposes of illustration only and should not be understood to limit the inventions.

The invention will be discussed with reference to flowcharts. The flowcharts make numerous mentions of querying a user for information. This act may be performed in a number of different ways. For example, in a preferred embodiment, the invention is practiced as an Internet site. In such an embodiment, the act of querying is performed by presenting a user with a number of choices that the user may "click" on to indicate a response. Such choices may be presented textually, such as by providing a number of hypertext links that move the user to a different portion of a hypertext document or different documents; or graphically.

Many other embodiments are also contemplated. Such embodiments include "standalone" computer software programs or point-of-sale displays which may provide for simple textual interaction (such as an embodiment in which the display consists of a simple alphanumeric device and a user responds with a numerical keypad to a series of textual inquiries) or more complex World-Wide-Web-like interaction. Obviously, embodiments such as point-of-sale embodiments may not have some of the features included in preferred embodiments discussed herein, such as presenting a user with a list of retail outlets where the product may be purchased (although a list of store locations may be presented).

Also, the preferred embodiments described herein pertain specifically to gardening advice for a typical homeowner or renter. However, it is to be understood that in an alternative embodiment, the method and system may be configured to produce general agricultural advice to farmers, professional horticulturists, and professional nurseries. In particular, the system and method may specifically be applied to allow a farmer to inventory crops growing upon his land, and to advise the farmer what fertilizers, pesticides, and other agricultural products to apply to his land, and a schedule for applying these materials, to optimize the farm's output.

Figure 1A:
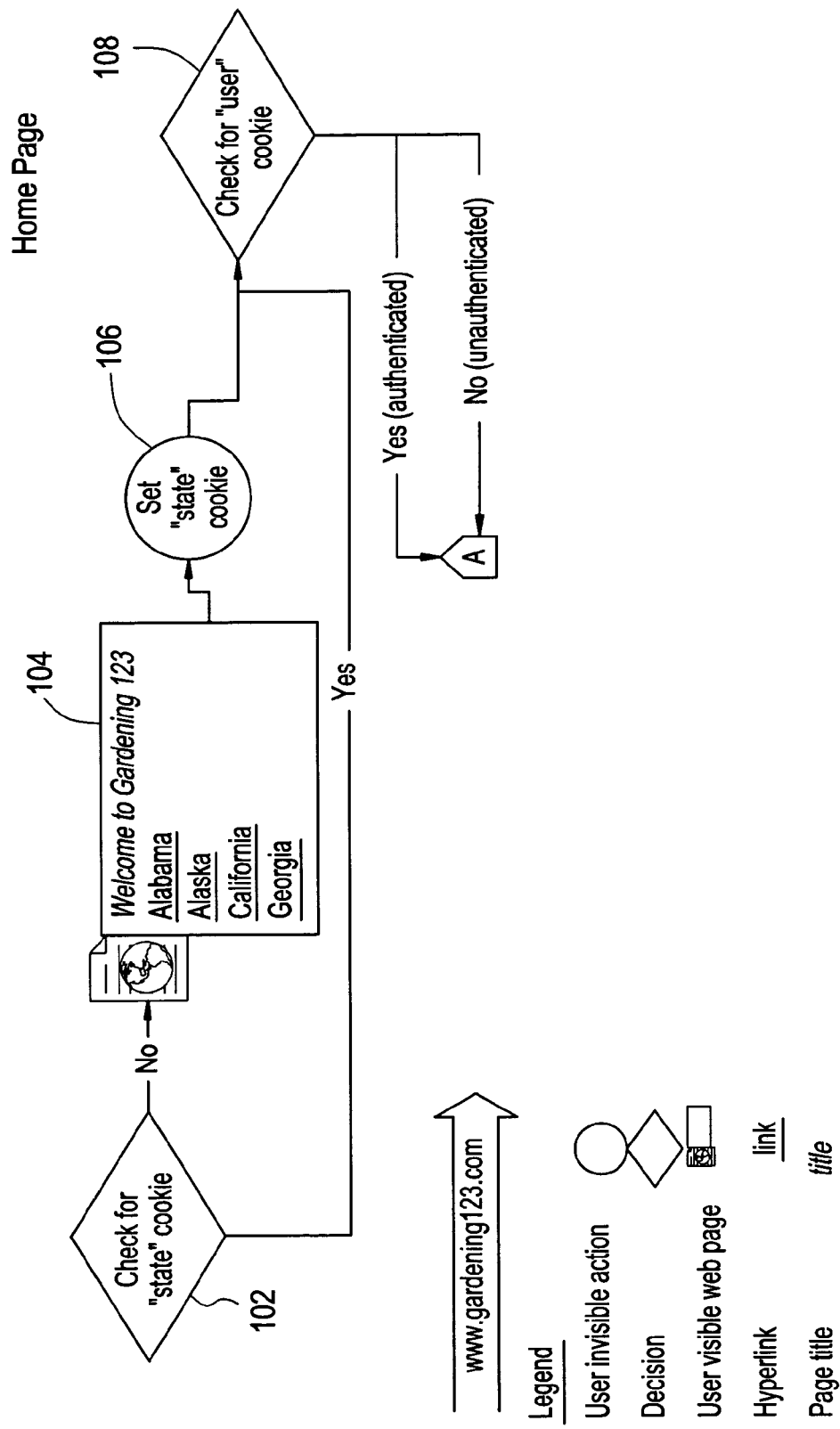
FIGS. 1A–1B illustrate a first portion of a flowchart of a first preferred embodiment of a method and system for supplying gardening/agricultural information and/or advice.
Figure 1B:
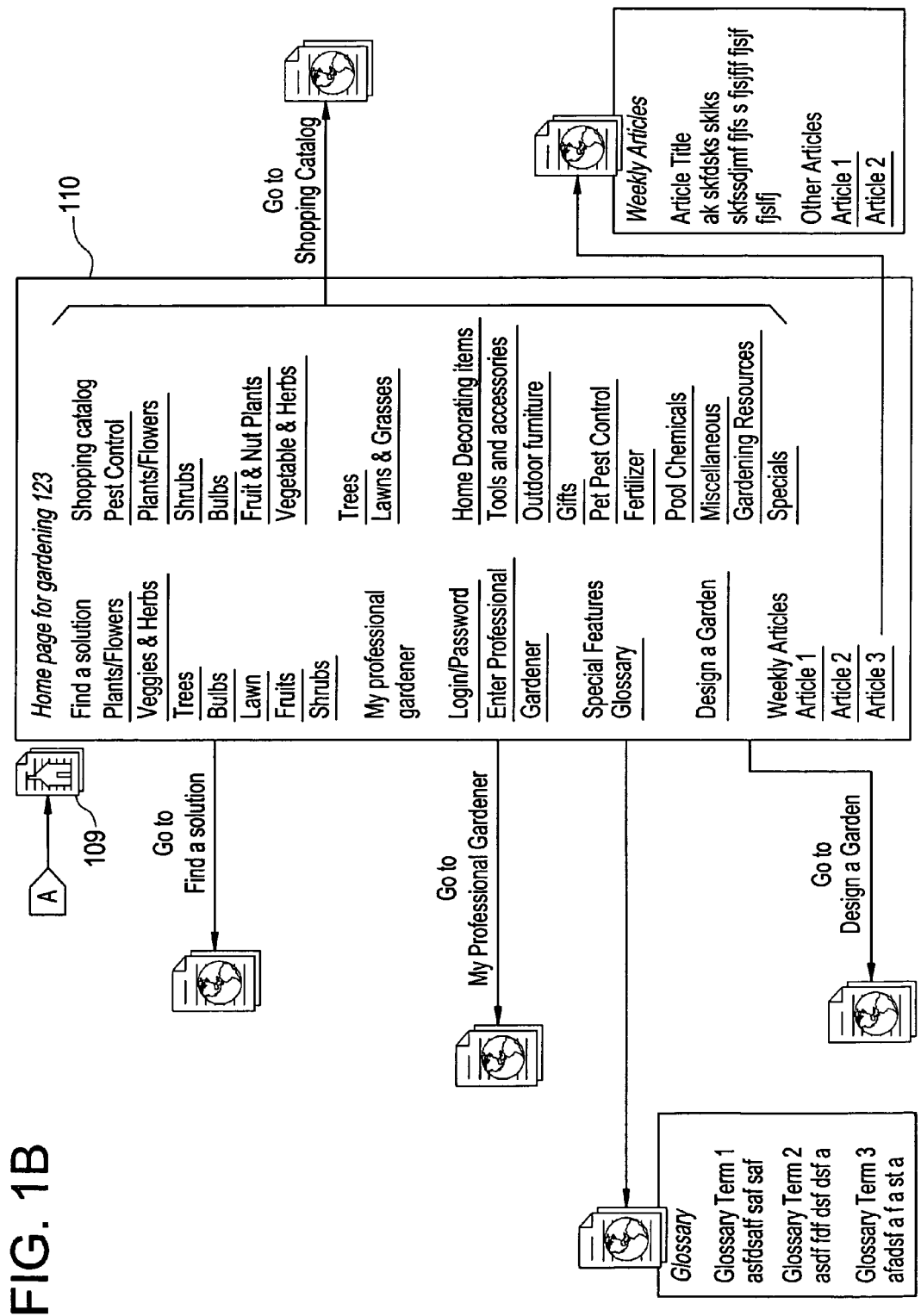
Figure 2A:
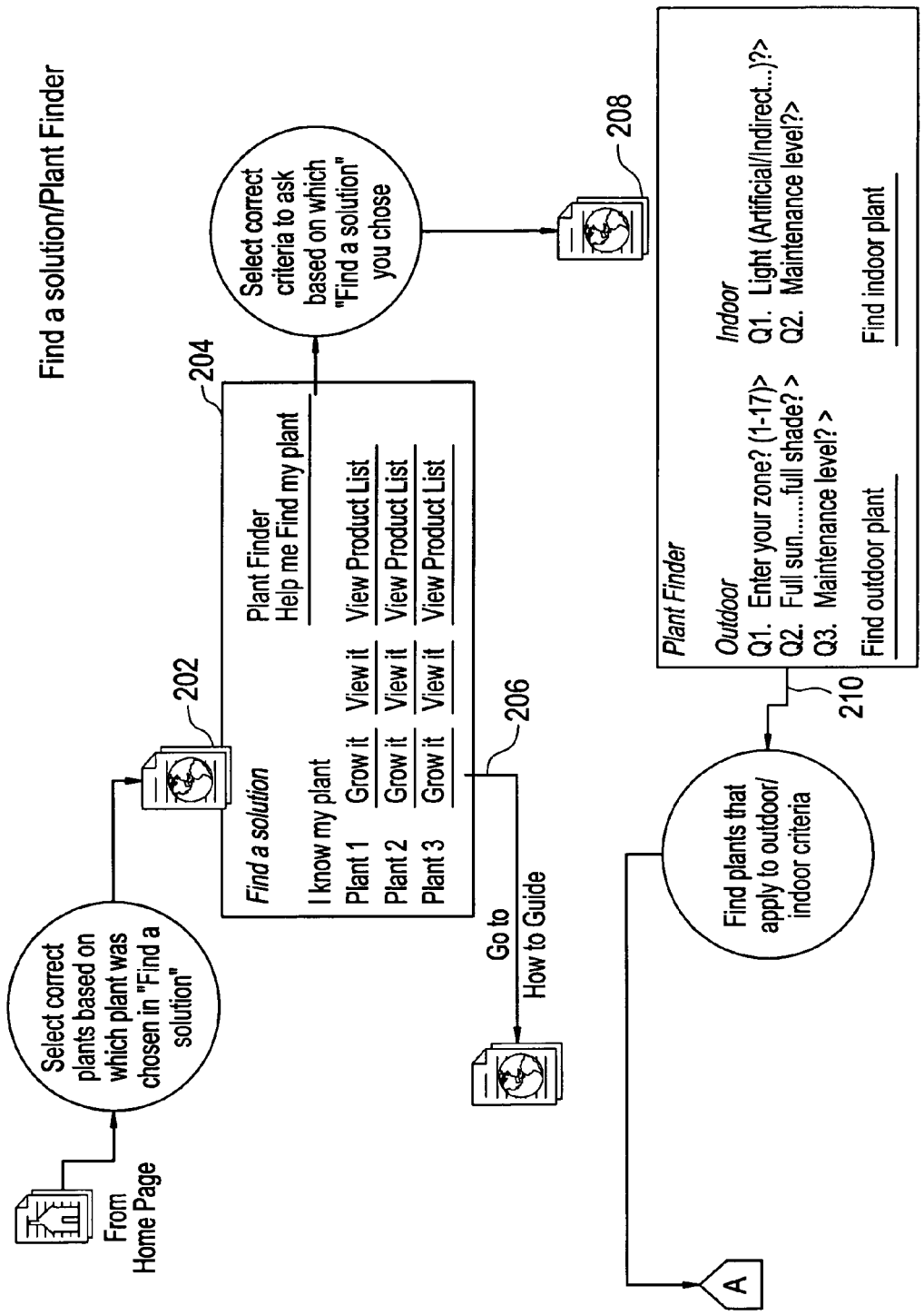
FIGS. 2A–2B illustrate a second portion of a flowchart of a first preferred embodiment of a method and system for supplying gardening/agricultural information and/or advice.
Figure 2B:
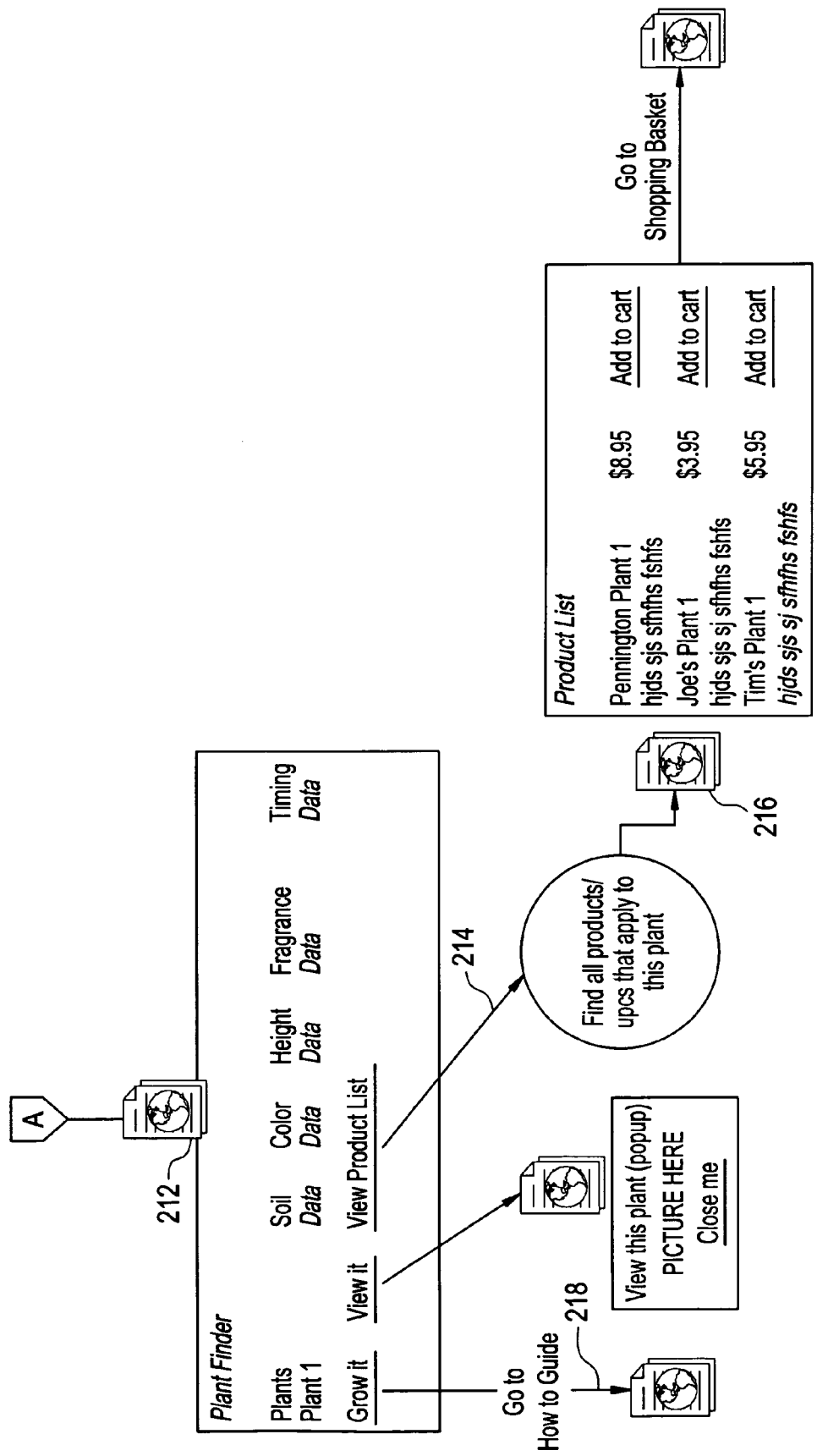
Figure 3A:
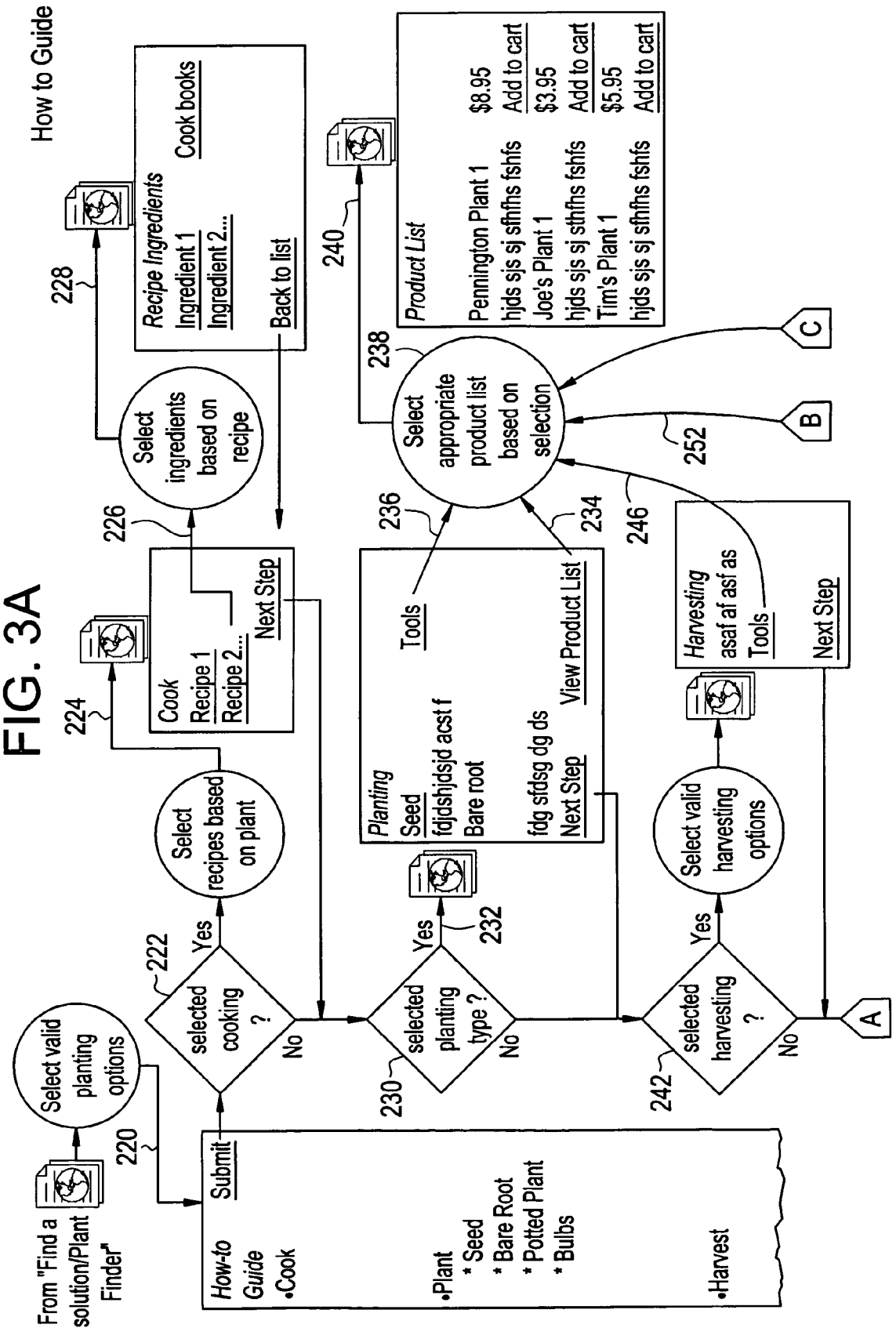
FIGS. 3A–3B illustrate a third portion of a flowchart of a first preferred embodiment of a method and system for supplying gardening/agricultural information and/or advice.
Figure 3B:
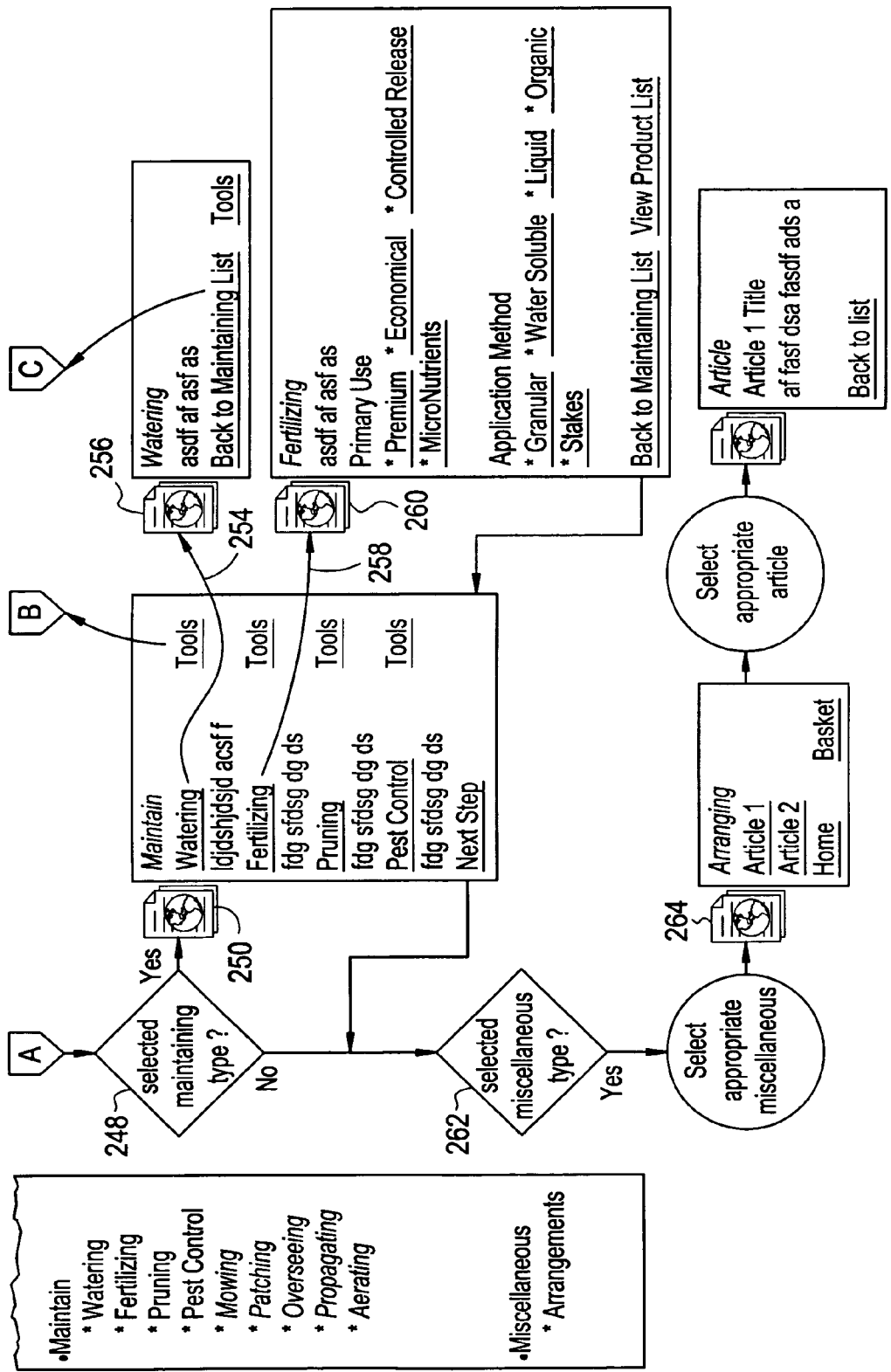

A portion of a flowchart 100 of a first preferred embodiment of a system and method of providing automated gardening/agricultural advice is illustrated in FIGS. 1A–1B. The flowchart 100 particularly applies to an embodiment for providing automated gardening/agricultural advice via an Internet gardening Web site. In that case, a user accesses the method and system by establishing an Internet connection between the user's Web browser and the gardening Web site.

In a step 102, the gardening Web site preferably queries the user's computer or other Web access device to check for a state "cookie" indicating the state in which the user's property is located. Alternatively, a "zip code" cookie or "county" cookie may be used. If the cookie is found, then the process proceeds to the step 108 as described below. If no cookie is found, then in a step 104, the user is queried for the state in which the user's property is located. Then a state cookie is set and sent to the user's computer in a step 106. Knowledge of the state in which a property is located is important because, for example, pesticides may be approved for use only in some states and may be approved for only certain uses in states where the pesticides are approved.

In a step 108, the gardening Web site queries the user's computer or other Web access device to check for a user cookie indicating the identity of the user. If the user cookie is found, then the user is authenticated by the gardening Web site and previously entered information regarding the user and his/her property is retrieved from a user database at the gardening Web site. If no user cookie is found, then the user is not authenticated and no information is available to the gardening Web site regarding the user or any property.

Then a gardening Web site home Web page is transmitted to the user in a step 109.

In the first preferred embodiment, several different processes are available to the user from the gardening Web site home Web page, including a plant finder/solution finder process, a professional gardening advice process, a garden designer process, and a product purchasing process.

In a step 110, the user selects from among the different processes a particular process which the user wants to execute. The process then proceeds accordingly.

If in the step 110 the user indicates that he/she has a gardening or agricultural problem with his or her property or wishes to locate or identify a particular plant, then he/she will proceed to the plant finder/solution finder process 200. FIGS. 2A–2B and 3A–3B show a first preferred embodiment of a flowchart for the plant finder/solution finder process 200.

In a step 202, the gardening Web site transmits a "Find a Solution" home page to the user. From the "Find a Solution" home page, a user may select a particular plant and view it, view a list of products for growing and maintaining it, or obtain specific advice and instructions regarding planting it, growing it, maintaining it, harvesting it, arranging it, cooking it, etc.

To proceed, the user first needs to identify a plant of interest. At the start, the "Find a Solution" home page allows a user to specify a plant category, such as: flowering plants; lawns and grasses; fruits nuts and berries; vegetables and herbs; shrubs; vines and ground cover; and trees. After selecting a plant category, in a step 204 the user indicates whether he/she knows the plant of interest. If the user knows their plant, then the "Find a Solution" Web page presents the user with a list of plants within their selected category.

After the user is presented with the list of plants, the user may view a picture of each plant by clicking a "View It" button associated with the plant so that the user may confirm which particular plant they are interested in. Once the user identifies a plant of interest, the user may then request more information or advice regarding the plant. In that case, in a step 206, the user selects a "Grow It" button associated with the plant of interest. Then, in a step 220 (shown in FIGS. 3A–3B), the gardening Web site transmits a "How-to Guide" home page to the user and the process continues as described in more detail below.

In some cases, the user may not be able to identify by name the plant of interest. In that case, in a step 204, the user may select a Plant Finder hyperlink to a "Plant Finder" home page of the gardening Web site.

If in the step 204 the user indicates that he/she wants the gardening Web site to assist in identifying the plant, then in a step 208, the gardening Web site transmits a "Plant Finder" home page to the user.

Through the "Plant Finder" home page, the gardening Web site presents the user with a series of questions about the plant to allow it to identify the plant. For example, the user may be queried for the plant type. If the user indicates that the plant of interest is an indoor plant, then the user may be further queried as to the type of light the plant should receive, a level of maintenance required for the plant of interest, etc.

If the user indicates that the plant of interest is an outdoor plant, then the user is then presented with a series of questions to help identify the plant of interest. In the preferred embodiment, the user is queried for a region of the country where the plant is located. The region may be identified according to processes and methods described in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson. Also, the user is preferably queried regarding the amount of sun the plant should receive, the level of maintenance required for the plant of interest, etc.

After the user has entered answers to the questions regarding the plant of interest, then in a step 210, the user selects a "Find Outdoor Plant" button or "Find Indoor Plant" button.

Then, in a step 212, the gardening Web site transmits a "Plant Finder Results" Web page to the user including a list of plants matching the user's answers to the questions from the "Plant Finder" home page. From the "Plant Finder Results" Web page, the user may view a picture of each plant in the list by clicking a "View It" button associated with the plant so that the user may confirm which particular plant they are interested in. Once the user has identified the plant of interest, he/she may view a list of products for growing and maintaining it, or obtain specific advice and instructions regarding planting it, growing it, maintaining it, harvesting it, arranging it, cooking it, etc.

If the user wants to view a list of products for growing and maintaining an identified plant of interest, then in a step 214, the user selects a "View Product List" button associated with the plant of interest.

In that case, in a step 216 the gardening Web site transmits a "Product List" Web page to the user including a list of agricultural and gardening products that are appropriate for the plant of interest. Such products may include, for example, seeds, cutting, potted plants, fertilizers, pesticides, etc. Preferably, via hypertext links on the "Product List" Web page, the user may select a product for purchase, in which case the process continues at a step 608 (shown in FIGS. 7A–7B) of the product purchasing process 600 as described in more detail below.

If the user wants specific advice and instructions regarding planting, growing, maintaining, harvesting, arranging, cooking, etc. an identified plant of interest, then in a step 218 the user selects a "Grow It" button associated with the plant of interest In that case, in a step 220, the gardening Web site transmits a "How-to Guide" home page to the user.

Through the "How-to Guide" home page, the user may obtain information, including advice, instructions, tools, products, etc. about cooking, planting, harvesting, maintaining, or arranging the plant of interest. The user may select any of these options by clicking on a corresponding button on the "How-to Guide" home page.

In a step 222, the gardening Web site determines whether the user has selected cooking. If the user selected cooking, then in a step 224, the gardening Web site transmits a "Cooking" Web page to the user. The "Cooking" Web page includes a list of recipes for preparing foods using the particular plant of interest (e.g., a vegetable, fruit, nut, berry, etc.).

Then, in a step 226, the user may select one of the recipes in the list. In that case, in a step 228, the gardening Web site transmits a "Recipe" Web page to the user.

If in the step 222 it is determined that the user did not select cooking, then in a step 230, the gardening Web site determines whether the user has selected planting. If the user selected planting, then in a step 232, the gardening Web site transmits a "Planting" Web page to the user.

Preferably, the "Planting" Web page includes a description of planting options for the particular plant of interest. Planting options may include seeds, bare roots, bulbs, potted plants, etc.

If the user wants to view a list of products for growing and maintaining an identified plant of interest, then in a step 234, the user selects a "View Product List" button associated with the plant of interest. Alternatively, if the user wants to view a list of tools for planting an identified plant of interest, then in a step 236, the user selects a "Tools" button associated with the plant of interest.

If the user selects the "View Product List" button in the step 234, or the "Tools" button in the step 236, then in a step 238, the gardening Web site selects an appropriate product list to match the identified plant of interest and the selection made by the user. Then, in a step 240, the gardening Web site transmits a corresponding "Product List" Web page to the user. For example, if the user has selected the "View Product List" button in the step 234, then the "Product List" Web page may include a list of agricultural and gardening products that apply to the plant of interest. Such products may include, for example, seeds, cutting, potted plants, fertilizers, pesticides, etc. Preferably, via hypertext links on the "Product List" Web page, the user may select a product for purchase, in which case the process continues at a step 608 (shown in FIGS. 7A–7B) of the product purchasing process 600 as described in more detail below.

If in the step 230 it is determined that the user did not select planting, then in a step 242, the gardening Web site determines whether the user has selected harvesting.

If the user selected harvesting, then in a step 244, the gardening Web site transmits a "Harvesting" Web page to the user. The "Harvesting" Web page includes information about harvesting the particular plant of interest. Preferably, the "Harvesting" Web page also includes a "Tools" button associated with harvesting the plant of interest. If the user selects the "Tools" button in a step 246, then in the step 238, the gardening Web site selects an appropriate product list of tools for harvesting the identified plant of interest as described above.

If in the step 242 it is determined that the user did not select harvesting, then in a step 248, the gardening Web site determines whether the user has selected maintaining.

If the user selected maintaining, then in a step 250, the gardening Web site transmits a "Maintaining" Web page to the user. Preferably, the "Maintaining" Web page includes hypertext buttons for Web pages with information on watering, fertilizing, pruning, and controlling pests for the particular plant of interest. Also preferably, the user may click on one or more "Tools" buttons associated with the maintenance choices presented to the user. If the user selects the "Tools" button in a step 252, then in the step 238, the gardening Web site selects an appropriate product list to match the identified plant of interest as described above.

If the user wants more information on watering the particular plant of interest, then in a step 254, the user clicks on the hypertext button for a "Watering" Web page. In that case, in a step 256, the gardening Web site transmits to the user the "Watering" Web page having information about watering the particular plant of interest, and preferably having a "Tools" button as described above.

If the user wants more information on fertilizing the particular plant of interest, then in a step 258, the user clicks on the hypertext button for a "Fertilizing" Web page. In that case, in a step 260, the gardening Web site transmits to the user the "Fertilizing" home page having information about fertilizing the particular plant of interest.

Preferably, the "Fertilizing" home page allows the user to choose a classification for identifying a fertilizer for the particular plant of interest. For example, the user may choose to have fertilizers classified by primary use as premium, economical, controlled release, micronutrient type, etc. Also, the user may choose to have fertilizers classified by application method, such as granular, water soluble, liquid, organic, stakes, etc. Based upon the choices made by the user, the gardening Web site transmits fertilizer Web pages to the user that include lists of various fertilizer products which may be purchased by the user.

If, from the "Maintenance Page" the user wants more information on pruning the particular plant of interest, the user clicks on the hypertext button for a "Pruning" Web page. The "Pruning" Web page may include information about pruning the particular plant of interest and may also include a "Tools" button for information on appropriate tools to prune the plant. For example, if the plant is a type of lawn grass, the "Tools" button may lead the user to a Web page with a list of lawnmower and edger products.

If, from the "Maintenance Page" the user wants more information on controlling pests for the particular plant of interest, the user clicks on the hypertext button for a "Pest Control" home page. The "Pest Control" home page may guide the user through a process of identifying a particular pest and selecting an appropriate pest control product. This process may operate according to methods described in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson.

If in the step 248 it is determined that the user did not select maintaining, then in a step 262 the gardening Web site determines that the user selected arranging. In that case, in a step 264, the gardening Web site transmits an "Arranging" home page to the user for the particular plant of interest. The "Arranging" home page may contain a list of hypertext links to articles describing floral arrangements using the particular plant of interest.

Figure 4A:
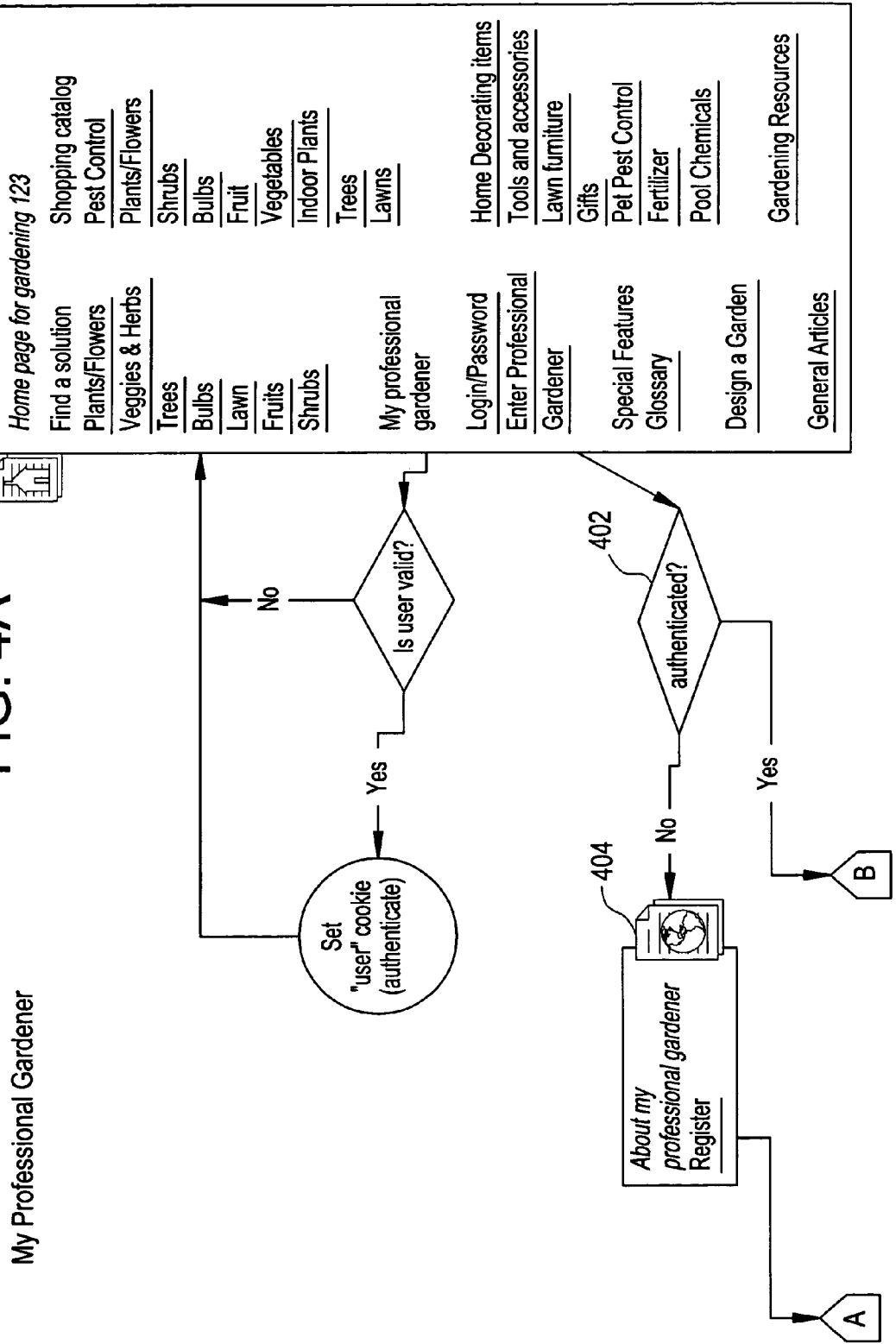

If in the step 110 the user indicates that he/she wants professional gardening advice, then he/she will proceed to the professional gardening advice process. FIGS. 4A–4B show a first preferred embodiment of a flowchart for the professional gardening advice process 400.

In that case, in a step 402, the gardening Web site checks to see whether the user has been authenticated.

If the user is a new user, the gardening Web site will determine that the user has not been authenticated, and in a step 404 transmits a "Registration" Web page to the user. Preferably, the Registration page includes information about the gardening Web site's professional gardening advice service and a hypertext "Registration" button for the user to click to start a registration process.

When the user selects the registration process, then in a step 406, the gardening Web site transmits to the user a "Registration Info" Web page for the user to enter pertinent registration information, such as a name, password, e-mail address, etc. Preferably, the registration information may be obtained over a secure Web connection, in which case the user may also provide credit card and shipping information for any products which the user may order through the gardening Web site. After entering the registration information, the user clicks on a hypertext button to submit the information to the gardening Web site.

Upon receiving the new user registration information, in a step 410 the gardening Web site transmits to the user a "My Professional Gardener" home page.

Preferably, the "My Professional Gardener" home page includes hyperlink buttons to allow a user to enter or review information regarding plant life on the user's property, to review a maintenance plan for the plant life on the user's property, or to review general gardening or agricultural articles of interest.

If the user wants to enter or review information describing plant life on the user's property, then the user selects a "My Report" button and in a step 412, the gardening Web site transmits to the user a "My Report" home page.

Through the "My Report" home page, the user can may be presented with a list of the user's properties, may select a property, and may enter data pertaining to the user's property, including for example, a property name or descriptor and a geographical region where the property is located. The process of identifying a geographical region may be performed according to any process described in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson.

Also, the user may create an inventory of the desirable and undesirable plant life on the user's property. Weeds are one example of an undesirable plant life. Plants may be identified and entered into the inventory in a variety of ways, including preferably through the plant finder/solution finder process 200 described above. As the user adds new plants to his/her property, they may be added to the inventory through the "My Report" home page.

Optionally, the user also may specify other information, such as the user's outdoor pets, or particular pests that are prevalent on the user's property that impact the plant life. All of this information may be used by the gardening Web site to develop a maintenance plan which is optimal for the user's property.

After entering the property data, the plant life inventory, and other information, the user may submit the data to the gardening Web site. This data is then retained in a user plant life database at the gardening Web site. Plant life data also may be added/deleted from the plant life inventory.

Based upon the user's plant life and property data, the gardening Web site then automatically constructs a recommended maintenance plan for the user's property. The maintenance plan can include a schedule of maintenance for each different plant on the user's property, together with recommended gardening and agricultural materials, such as fertilizers, pesticides, weed killers, etc. and, optionally, a pruning schedule, as appropriate. Preferably, specific instructions are supplied to the user in a timely fashion as to when and how to apply various gardening materials, as well as exactly which gardening materials should be applied, to the various types of plant life on the user's property. If the user so chooses, recommended gardening materials may be automatically sent to the user in a timely fashion according to the maintenance plan, and a user-designated account (e.g., credit card) may be automatically debited accordingly.

The maintenance plan is then be stored at the gardening Web site and may be viewed by the user as described below with respect to step 414. Either supplementally or alternatively, the maintenance plan may be communicated to the user via one or more e-mail messages. For example, the user may receive a periodic (e.g., weekly, monthly, daily) e-mail message indicating all of the recommended maintenance for the user's property for that period. Also, reminders may be provided to the user within a few days or a week of when a gardening material should be applied. The method of communicating the maintenance plan information to the user may be selected by the gardening Web site or by the user.

Preferably, the recommended gardening and agricultural materials are selected based upon the region where the property is located. For example, the gardening Web site would not recommend pesticides or weed killers that are not licenses for use in the state where the property is located.

In a particularly preferred embodiment, the recommended gardening and agricultural materials for each plant are selected taking into account other plants, pests, and user pets that are located on the user's property. For example, certain products that may be effective in killing undesirable weeds in the grass lawn of the user's property may also be detrimental to desirable shrubs and flowers located on the property, or may be harmful to the user's pets. In that case, preferably the gardening Web site will construct a maintenance plan which selects alternative products which are safe for the user's pets and the desirable plants on the property, or, alternatively, advises the user of the possible dangers and suggests proper precautions.

Preferably, the gardening Web site automatically modifies the recommended maintenance plan for the user's property as new information becomes available. Preferably, as maintenance is performed on the property, preferably the user may submit the maintenance information to the gardening Web site. So, for example, if certain gardening or agricultural materials are more effective if their use is rotated in conjunction with other materials, the gardening Web site's algorithms can recognize that fact and modify the user's maintenance plan accordingly. Also, if a new weed-killer becomes licensed in the user's state, the gardening Web site's maintenance plan development algorithm can automatically determine whether this product should be substituted for a product or products in the previous maintenance plan. Or, for another example, if the user updates the user's information in "My Report" to note the presence of weeds or pests not previously present, the maintenance plan algorithm may modify the recommended maintenance plan accordingly. Preferably, the gardening Web site may update the user's maintenance plan in real time. The important thing to note is that in the first preferred embodiment, the algorithm for determining the maintenance plan for the user's property may be adaptable and may in fact "learn" from previous history and results for the plant life on the user's property, and indeed, even other similar properties whose information is stored at the gardening Web site.

If at the "My Professional Gardener" home page the user wants to review a maintenance plan for the plant life on the user's property, then the user selects a "Maintenance" button and in a step 414, the gardening Web site transmits to the user a "My Maintenance Plan" home page. Through the "My Maintenance Plan" home page, the user may view a recommended maintenance plan for the entire property, or for an individual plant. The recommended maintenance plan preferably includes a recommended maintenance schedule (e.g., dates and best time of day) for performing the maintenance, and may also include a list of one or more recommended products, such as tools, gardening and agricultural materials, etc., for performing the recommended maintenance.

If at the "My Professional Gardener" home page the user wants to review gardening or agricultural articles of interest, then the user selects an "Articles" button and in a step 416, the gardening Web site transmits to the user a "My Articles" home page. Through the "My Articles" home page, the user may view gardening or agricultural articles of interest.

If in the step 110 the user indicates that he/she wants to design a garden, then he/she will proceed to a garden designer process as shown in FIG. 5. The gardening Web site transmits a "Design a Garden" Web page to the user. Here, the user is may view, measure and plot a garden, producing a garden map that can be printed out and used as a planting reference. Preferably, the "Design a Garden" Web page includes a list of preplanned gardens which may be viewed, printed, and downloaded. The preplanned gardens may be downloaded in any convenient format, such as a GIF file, a JPEG file, or an ACROBAT® file. Also, the user may view and print a list of plants and gardening materials needed for the garden, and may order some or all of these products through hypertext links at the gardening Web site.

Figure 6:
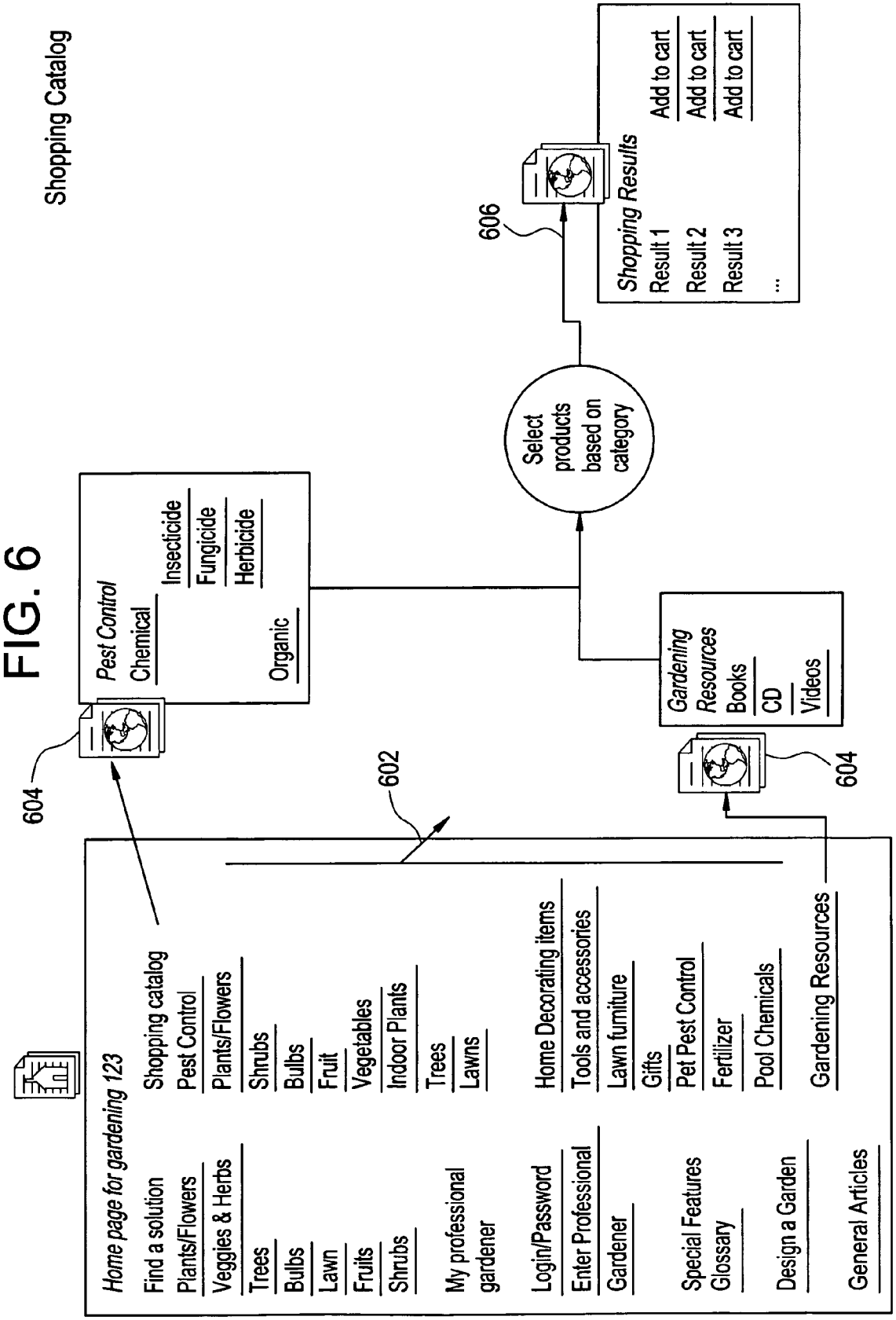
FIG. 6 is a sixth portion of a flowchart of a first preferred embodiment of a method and system for supplying gardening/agricultural information and/or advice.

If in the step 110 the user indicates that he/she wants to purchase a gardening or agricultural product, then he/she will proceed to the product purchasing process. FIG. 6 shows a first preferred embodiment of a flowchart for the product purchasing process 600.

In a step 602, the user selects from a list of available catalogs of products on the gardening Web site home page. Then, in a step 604, the gardening Web site sends to the user a corresponding product catalog home page through which the user may identify and select one or more products to be ordered by the user. In a step 606, the user selects a product for purchase. Then, in a step 608, the gardening Web site automatically adds the selected product to a virtual shopping basket for the user.

Next, in a step 610, the gardening Web site transmits to the user a "Shopping Basket" Web page indicating all of the products which the user has selected for purchase. From the "Shopping Basket" Web page, the user may return to a previous process, such as the plant finder/solution finder process, the professional gardening advice process, or the garden designer process, or continue adding products through the product purchasing process. Alternatively, in a step 612, the user may indicate that he/she is ready to checkout and purchase the selected products.

In that case, in a step 614, the gardening Web site transmits to the user a "Shipping Information" Web page whereby the user supplies information where the products are to be shipped. Preferably, the gardening Web site establishes a secure connection with the user for communicating the purchase information, such as shipping details and credit card account numbers. Alternatively, as described earlier, the user may supply this information during the user registration process.

After the user has supplied the shipping information, in a step 616 the gardening Web site transmits to the user a "Payment Information" Web page whereby the Web site provides a total price, including shipping, for the selected products, and whereby the user supplies payment information, such as a credit card type, account number and expiration date.

At this point, the user may cancel the order and return to the "Shopping Basket" Web page at the step 610. Alternatively, the user may change the shipping information and return to the "Shipping Information" Web page at the step 614.

If the user is satisfied with the order, then the user may place the order and, then in a step 618, the gardening Web site will send to the user a "Purchase Confirmation" Web page. From the "Purchase Confirmation" Web page, the user may request a receipt for the order. In that case, in a step 620, the gardening Web site will send to the user a receipt, preferably a printable receipt. Also, the user may request a history of all previous orders placed by the user. In that case, in a step 622, the gardening Web site will send to the user a "Purchase History" Web page listing all of the user's purchases.

Figure 8A:
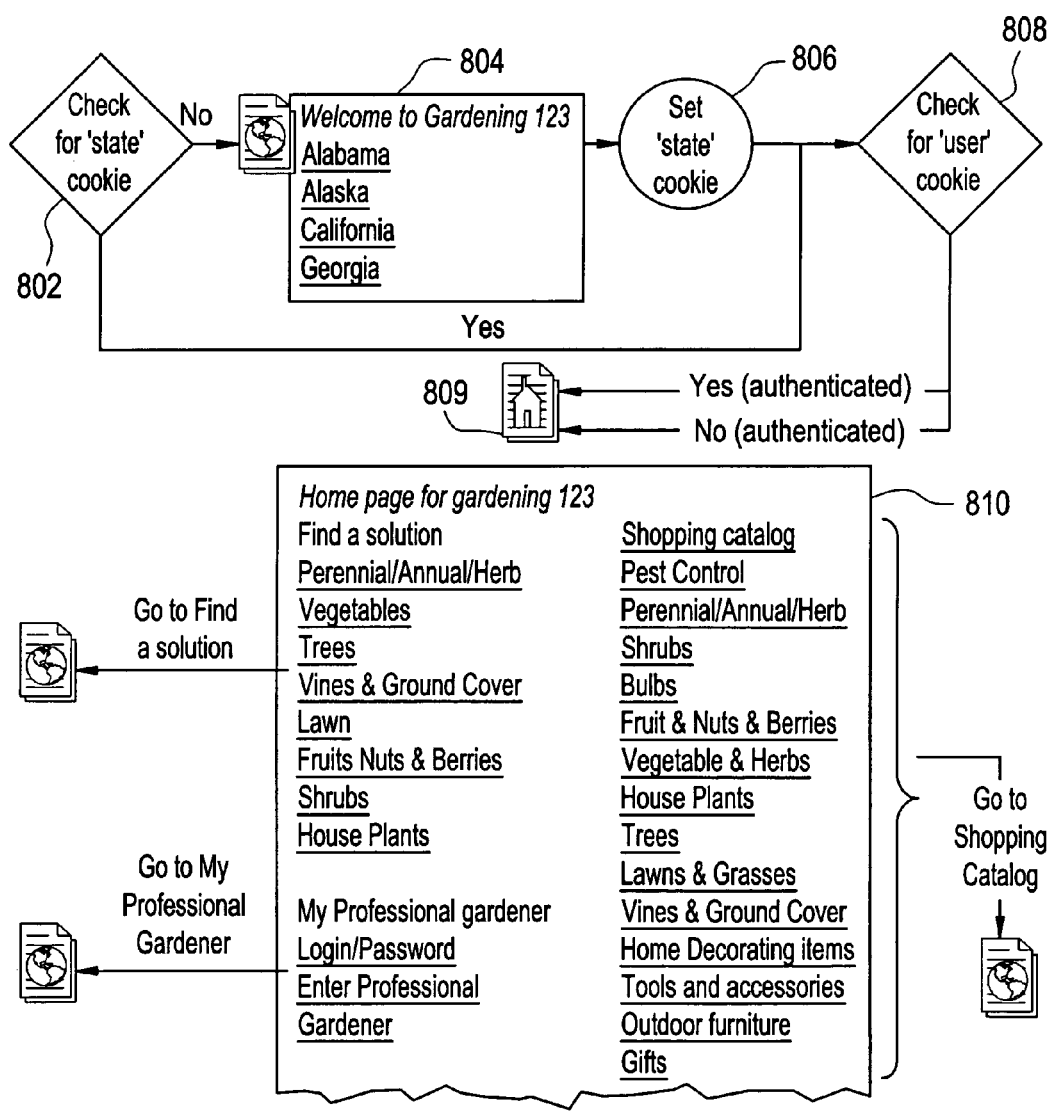
FIGS. 8A–8B illustrate a first portion of a flowchart of a second preferred embodiment of a method and system for supplying gardening/agricultural information and/or advice.
Figure 8B:
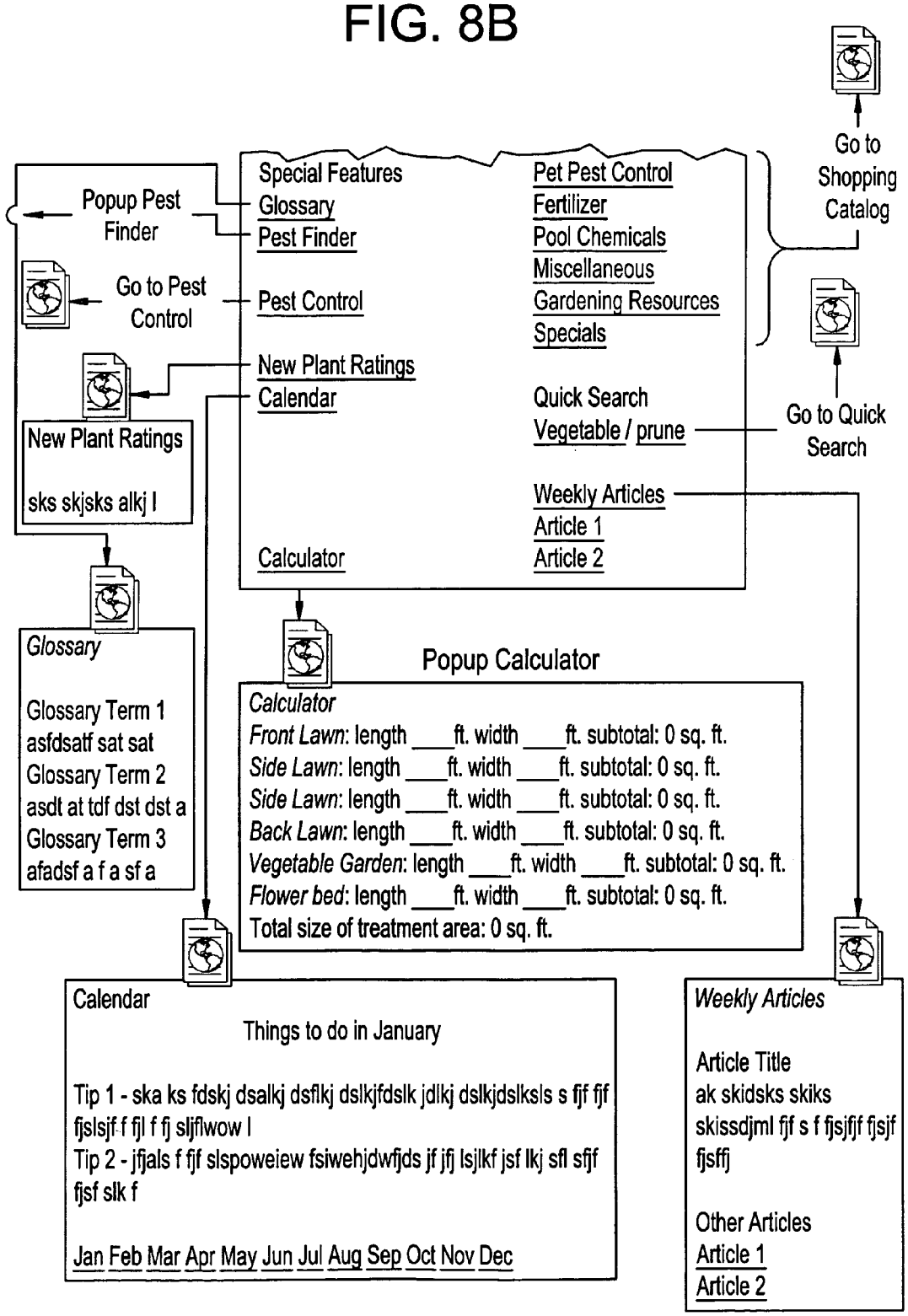
Figure 9A:
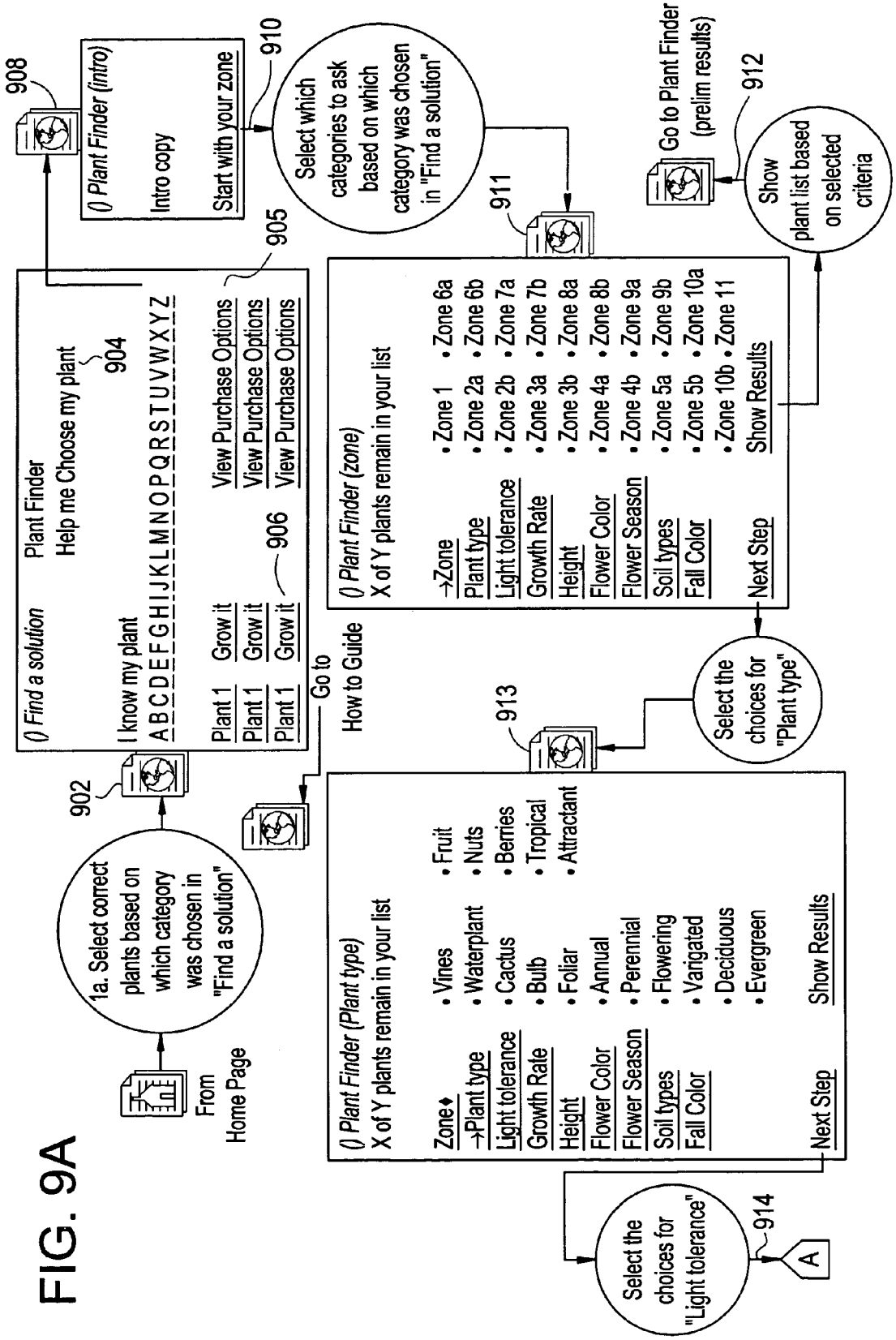
FIGS. 9A–9B illustrate a second portion of a flowchart of a second preferred embodiment of a method and system for supplying gardening/agricultural information and/or advice.
Figure 9B:
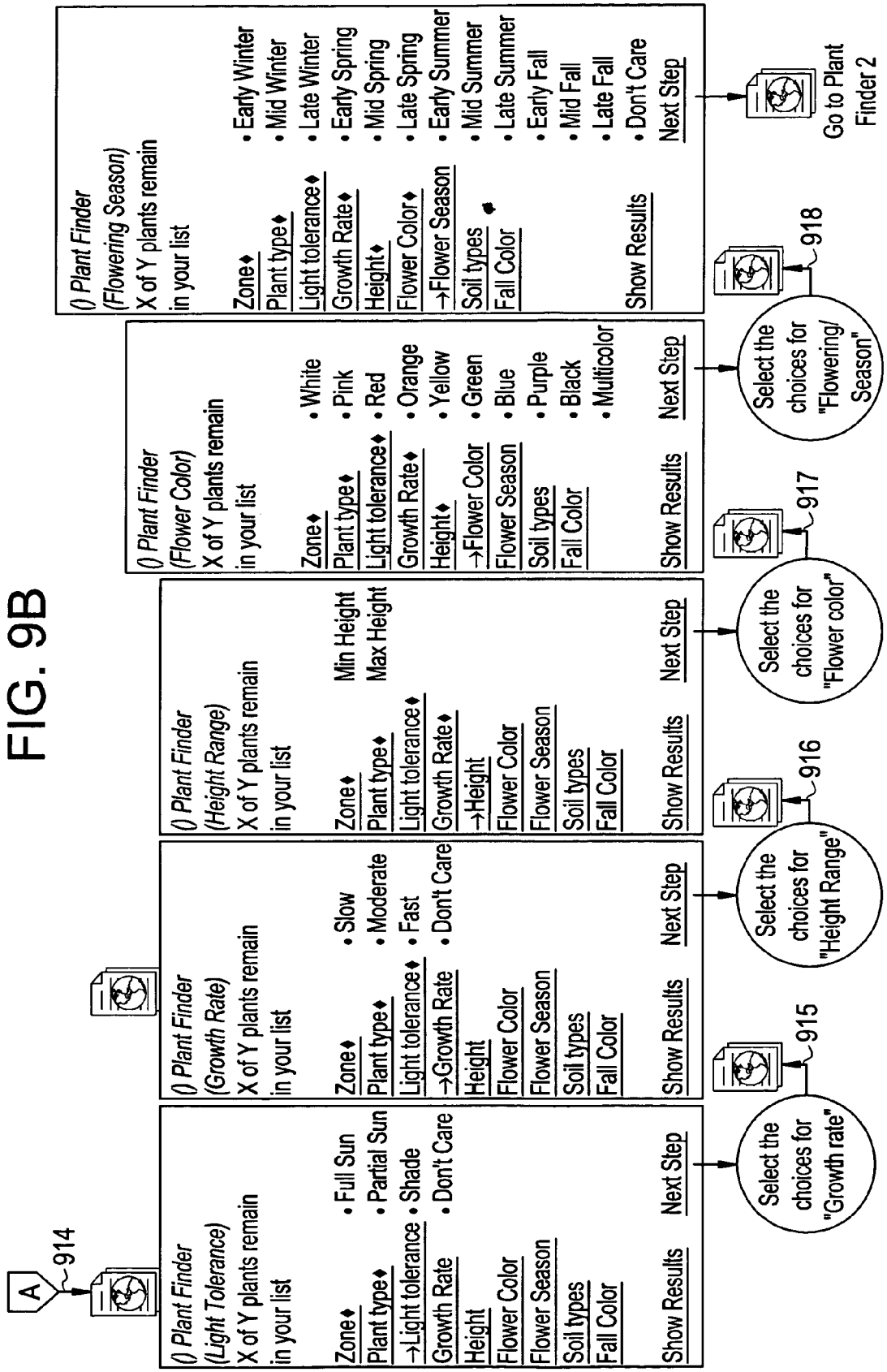
Figure 10A:
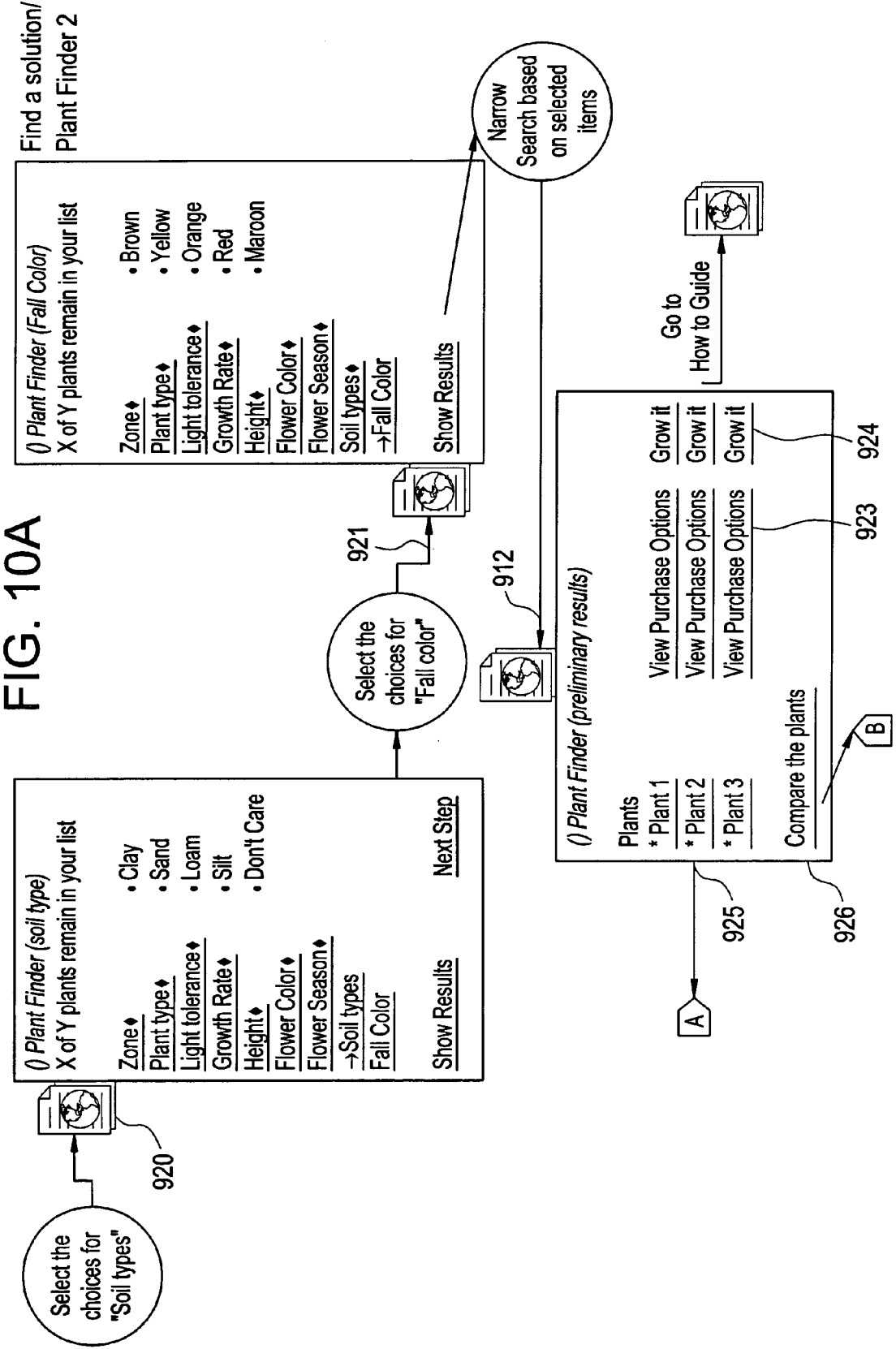
FIGS. 10A–10B illustrate a third portion of a flowchart of a second preferred embodiment of a method and system for supplying gardening/agricultural information and/or advice.
Figure 10B:
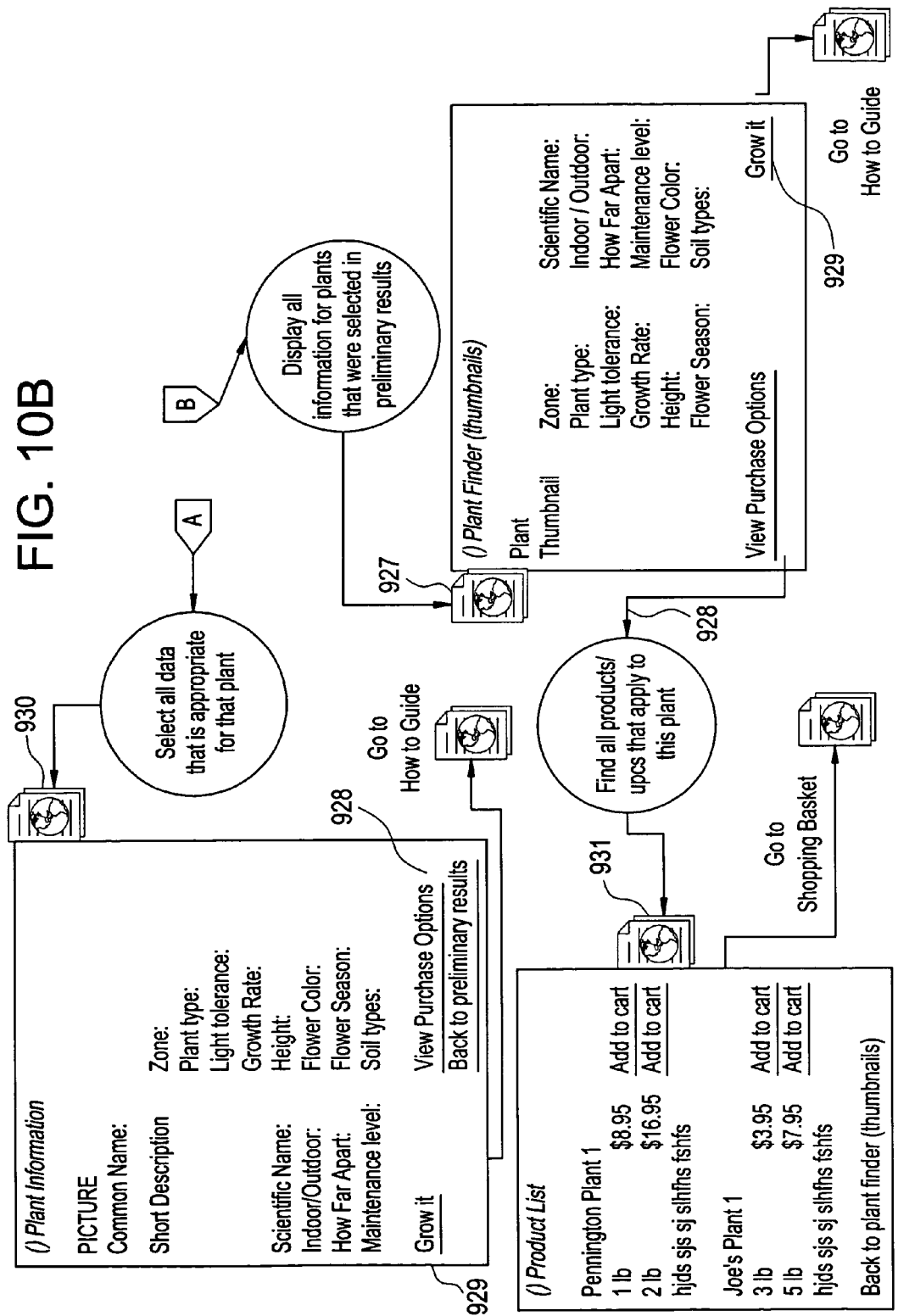
Figure 11A:
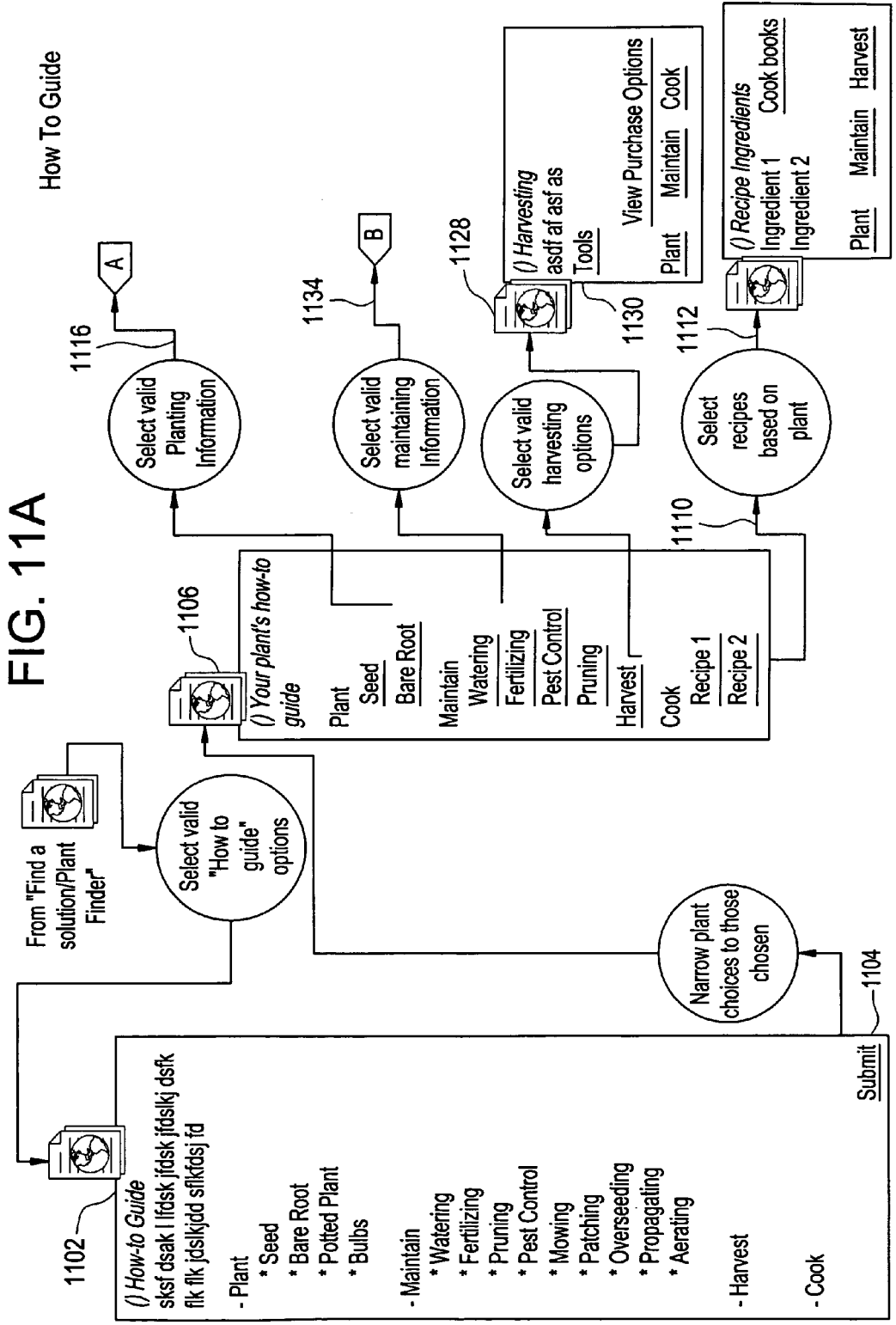
FIGS. 11A–11B illustrate a fourth portion of a flowchart of a second preferred embodiment of a method and system for supplying gardening/agricultural information and/or advice.
Figure 11B:
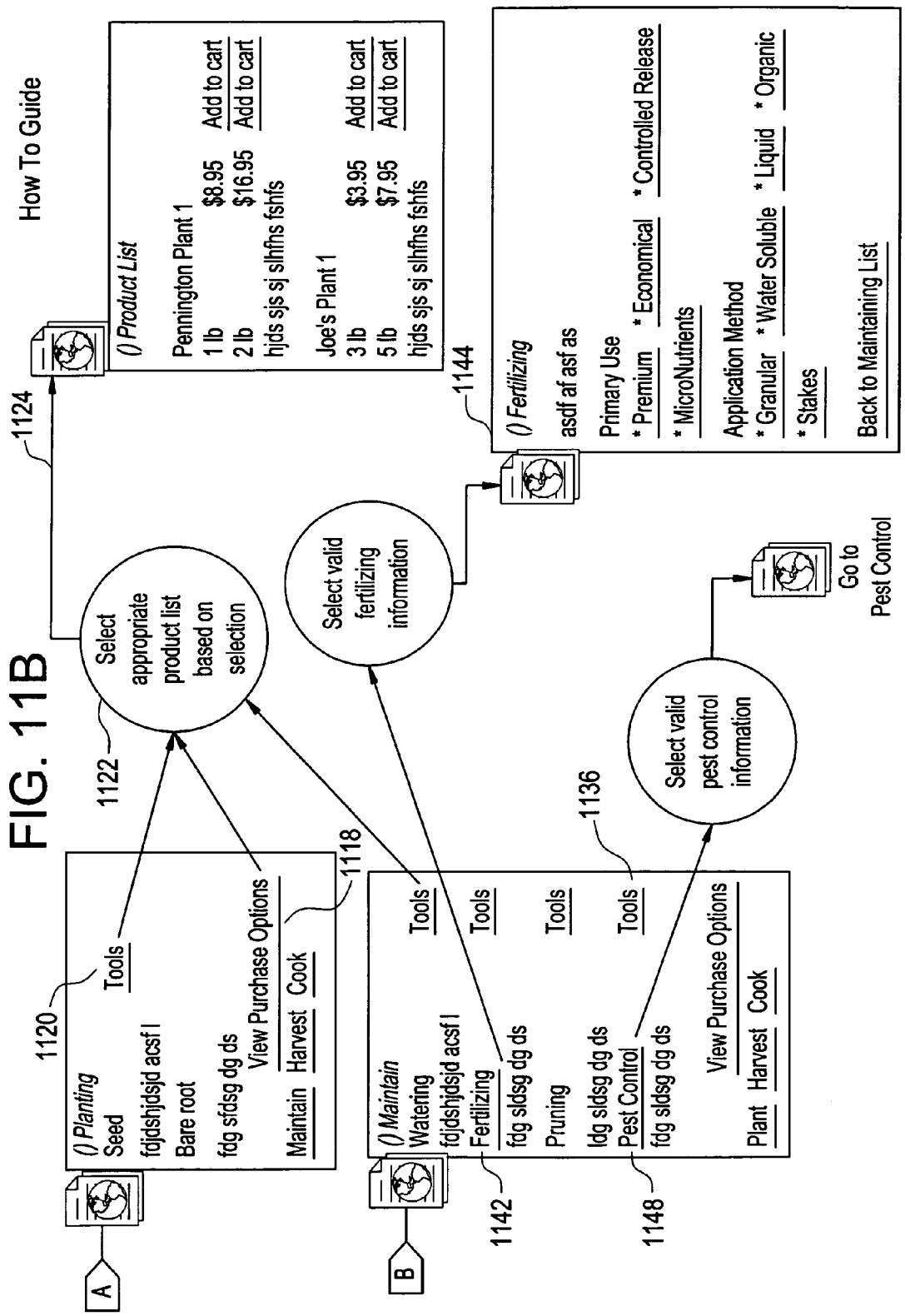

A portion of a flowchart 800 of a second preferred embodiment of a system and method of providing automated gardening/agricultural advice is illustrated in FIGS. 8A–8B. The flowchart 800 particularly applies to an embodiment for providing automated gardening/agricultural advice via an Internet gardening Web site. In that case, a user accesses the method and system by establishing an Internet connection between the user's Web browser and the gardening Web site.

In a step 802, the gardening Web site preferably queries the user's computer or other Web access device to check for a state "cookie" indicating the state in which the user's property is located. Alternatively, a "zip code" cookie or "county" cookie may be used. If the cookie is found, then the process proceeds to the step 808 as described below. If no cookie is found, then in a step 804, the user is queried for the state in which the user's property is located. Then a state cookie is set and sent to the user's computer in a step 806. Knowledge of the state in which a property is located is important because, for example, pesticides may be approved for use only in some states and may be approved for only certain uses in states where the pesticides are approved.

In a step 808, the gardening Web site queries the user's computer or other Web access device to check for a user cookie indicating the identity of the user. If the user cookie is found, then the user is authenticated by the gardening Web site and previously entered information regarding the user and his/her property is retrieved from a user database at the gardening Web site. If no user cookie is found, then the user is not authenticated and no information is available to the gardening Web site regarding the user or any property.

Then a gardening Web site home Web page is transmitted to the user in a step 809.

In the second preferred embodiment, several different processes are available to the user from the gardening Web site home Web page, including a plant finder/solution finder process, a professional gardening advice process, a pest finder process, a quick search process, and a product purchasing process.

Preferably, the gardening Web site home Web page also includes hypertext links to several different tools, including a popup pest finder tool, a new plant ratings tool, a gardening calendar, a popup calculator, and an index of gardening articles. The popup pest finder tool may include an alphabetized index of well-known pests. The new plant ratings tool may include a list of new plants and their ratings. The gardening calendar tool may include a generic calendar, selectable by month, listing recommended gardening activities for the month. The popup calculator may include user entry boxes for calculating the area of a user's lawn or garden.

In a step 810, the user selects from among the different processes a particular process which the user wants to execute. The process then proceeds accordingly.

If in the step 810 the user indicates that he/she has a gardening or agricultural problem with his or her property or wishes to locate or identify a particular plant, then he/she will proceed to the plant finder/solution finder process 900.

FIGS. 9A–9B, 10A–10B and 11A–11B illustrate a second preferred embodiment of a flowchart for the plant finder/solution finder process 900.

In a step 902, the gardening Web site transmits a "Find a Solution" home page to the user. From the "Find a Solution" home page, a user may select a particular plant and view it, view a list of products for growing and maintaining it, or obtain specific advice and instructions regarding planting it, growing it, maintaining it, harvesting it, arranging it, cooking it, etc.

To proceed, the user first needs to identify a plant of interest. At the start, the "Find a Solution" home page allows a user to alphabetically specify a name for the plant of interest. If the user knows their plant, then the user selects a first letter of the plant name and the "Find a Solution" Web page presents the user with a list of plants starting with the selected letter. Associated with each plant in the list is a "Grow It" button and a "View Purchase Options" button.

After the user is presented with the list of plants, the user may view options for purchasing the plant of interest by clicking on a "View Purchase Options" button associated with the plant of interest in a step 905. In that case, the gardening Web site transmits a "Product List" Web page to the user in a step 931 described in more detail below. If the user wants information about growing a plant of interest, then, in a step 906, the user selects a "Grow It" button associated with the plant of interest. Then, in a step 1102 (shown in FIGS. 11A–11B), the gardening Web site transmits a "How-to Guide" home page to the user and the process continues as described in more detail below.

In some cases, the user may not be able to identify by name the plant of interest. In that case, in a step 904, the user may select a Plant Finder hyperlink to a "Plant Finder" home page of the gardening Web site.

If in the step 904 the user indicates that he/she wants the gardening Web site to assist in identifying the plant, then in a step 908, the gardening Web site transmits a "Plant Finder" home page to the user.

Throughout the "Plant Finder" process, the gardening Web site presents the user with a series of questions about the plant to allow him/her to identify the plant. At each step in the process, the user may decide whether to see a list of plants meeting the criteria thus far supplied by the user, or whether to further refine the criteria by answering additional questions about the plant.

In a step 910, the user indicates that he/she is ready to start the plant finding process by first identifying a geographical region where the plant of interest is located.

In a step 911, the gardening Web site transmits a "Plant Finder Zone" page. In the preferred embodiment, the user is queried for a region of the country where the plant is located. The region may be identified according to processes and methods described in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson. Preferably, the user is asked to indicate a USDA hardiness zone where the plant of interest is located. After entering the USDA hardiness zone, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 913, the gardening Web site transmits a "Plant Finder—Plant Type" Web page to the user. The "Plant Finder—Plant Type" Web page lists a number of different plant types. Then, the user selects a plant type for the plant of interest. After entering the plant type, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 914, the gardening Web site transmits a "Plant Finder—Light Tolerance" Web page to the user. The "Plant Finder—Light Tolerance" Web page lists degrees of light tolerance. Then, the user selects a desired light tolerance level for the plant of interest. After entering the desired light tolerance level, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 915, the gardening Web site transmits a "Plant Finder—Growth Rate" Web page to the user. The "Plant Finder—Growth Rate" Web page lists degrees of growth rate. Then, the user selects a desired growth rate for the plant of interest. After entering the desired growth rate, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 916, the gardening Web site transmits a "Plant Finder—Height Range" Web page to the user. The "Plant Finder—Height Range" Web page allows a user to enter a desired height range for the plant of interest. Then, the user selects a desired height range for the plant of interest. After entering the desired height range, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 917, the gardening Web site transmits a "Plant Finder—Flower Color" Web page to the user. The "Plant Finder—Flower Color" Web page lists different flower colors. Then, the user selects a desired flower color for the plant of interest. After entering the desired flower color, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 918, the gardening Web site transmits a "Plant Finder—Flowering Season" Web page to the user. The "Plant Finder—Flowering Season" Web page lists different flowering seasons. Then, the user selects a desired flowering season for the plant of interest. After entering the desired flowering season, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 920, the gardening Web site transmits a "Plant Finder—Soil Type" Web page to the user. The "Plant Finder—Soil Type" Web page lists different soil types. Then, the user selects a desired soil type for the plant of interest. After entering the desired soil type, the user may decide to view preliminary results for all plants meeting the criteria thus far supplied by the user, or may decide to further refine the criteria by answering additional questions about the plant. If the user decides to view preliminary results, then in a step 912, the gardening Web site transmits a "Preliminary Results" Web page to the user and the process continues as described in more detail below.

If the user decides to further refine the criteria by answering additional questions about the plant, then in a step 921, the gardening Web site transmits a "Plant Finder—Fall Color" Web page to the user. The "Plant Finder—Fall Color" Web page lists different fall colors. Then, the user selects a desired fall color for the plant of interest. After entering the desired fall color, then in a step 912, the gardening Web site transmits a "Preliminary Results" Web page to the user.

The "Preliminary Results" Web page presents the user with a list of plants meeting the criteria provided by the user. Associated with each plant in the list is a "Grow It" button and a "View Purchase Options" button.

After the user is presented with the list of plants, then in a step 923, the user may view options for purchasing the plant of interest by clicking on a "View Purchase Options" button associated with the plant of interest. In that case, the gardening Web site transmits a "Product List" Web page to the user in a step 931 described in more detail below. If the user wants information about growing a plant of interest, then, in a step 924, the user selects a "Grow It" button associated with the plant of interest. Then, in a step 1102 (shown in FIGS. 11A–11B), the gardening Web site transmits a "How-to Guide" home page to the user and the process continues as described in more detail below. The user may also select a plant of interest from the list about which the user desires to obtain more data. In that case, in a step 925, the user clicks on a hypertext link for the plant of interest, and the process continues at the step 930 below. The user may also compare the preliminary results. In that case, in a step 926, the user clicks on a hypertext link for comparing the plants in the list.

Then, in a step 927, the gardening Web site transmits a "Plant Finder—Thumbnails" page. The "Plant Finder—Thumbnails" page includes thumbnail pictures of all the plants listed in the "Preliminary Results" Web page. Associated with each plant thumbnail is a "Grow It" button and a "View Purchase Options" button. The "Plant Finder—Thumbnails" Web page preferably includes a thumbnail picture of the plant, and specific data regarding the plant, such as scientific name, plant type, light tolerance, growth rate, height, flower color, flowering season, soil types, etc.

After the user is presented with the plant thumbnails, the user may view options for purchasing the plant of interest by clicking on a "View Purchase Options" button associated with the plant of interest in a step 928. In that case, the gardening Web site transmits a "Product List" Web page to the user in a step 931 described in more detail below. If the user wants information about growing a plant of interest, then, in a step 929, the user selects a "Grow It" button associated with the plant of interest. Then, in a step 1102 (shown in FIGS. 11A–11B), the gardening Web site transmits a "How-to Guide" home page to the user and the process continues as described in more detail below.

If the user clicks on a hypertext link for the plant of interest on the "Preliminary Results" Web page, then in a step 930, the gardening Web site transmits a "Plant Information" Web page to the user. The "Plant Information" Web page preferably includes a picture of the plant of interest and specific data regarding the plant, such as scientific name, plant type, light tolerance, growth rate, height, flower color, flowering season, soil types; etc.

If the user wants to view a list of products for growing and maintaining an identified plant of interest, then in a step 928, the user selects a "View Purchase Options" button associated with the plant of interest.

Figure 14A:
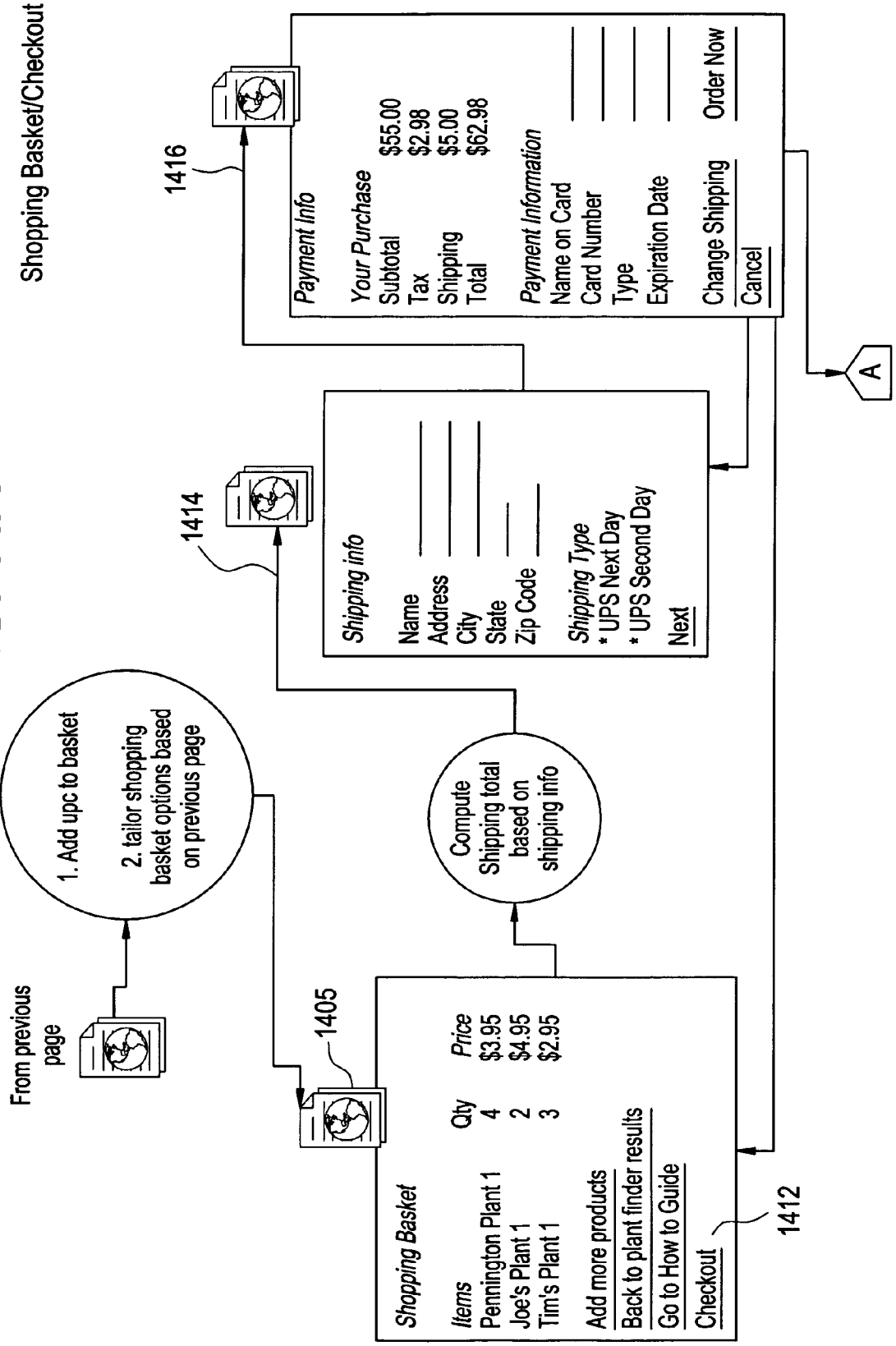
FIGS. 14A–14B illustrate a seventh portion of a flowchart of a second preferred embodiment of a method and system for supplying gardening/agricultural information and/or advice.
Figure 14B:
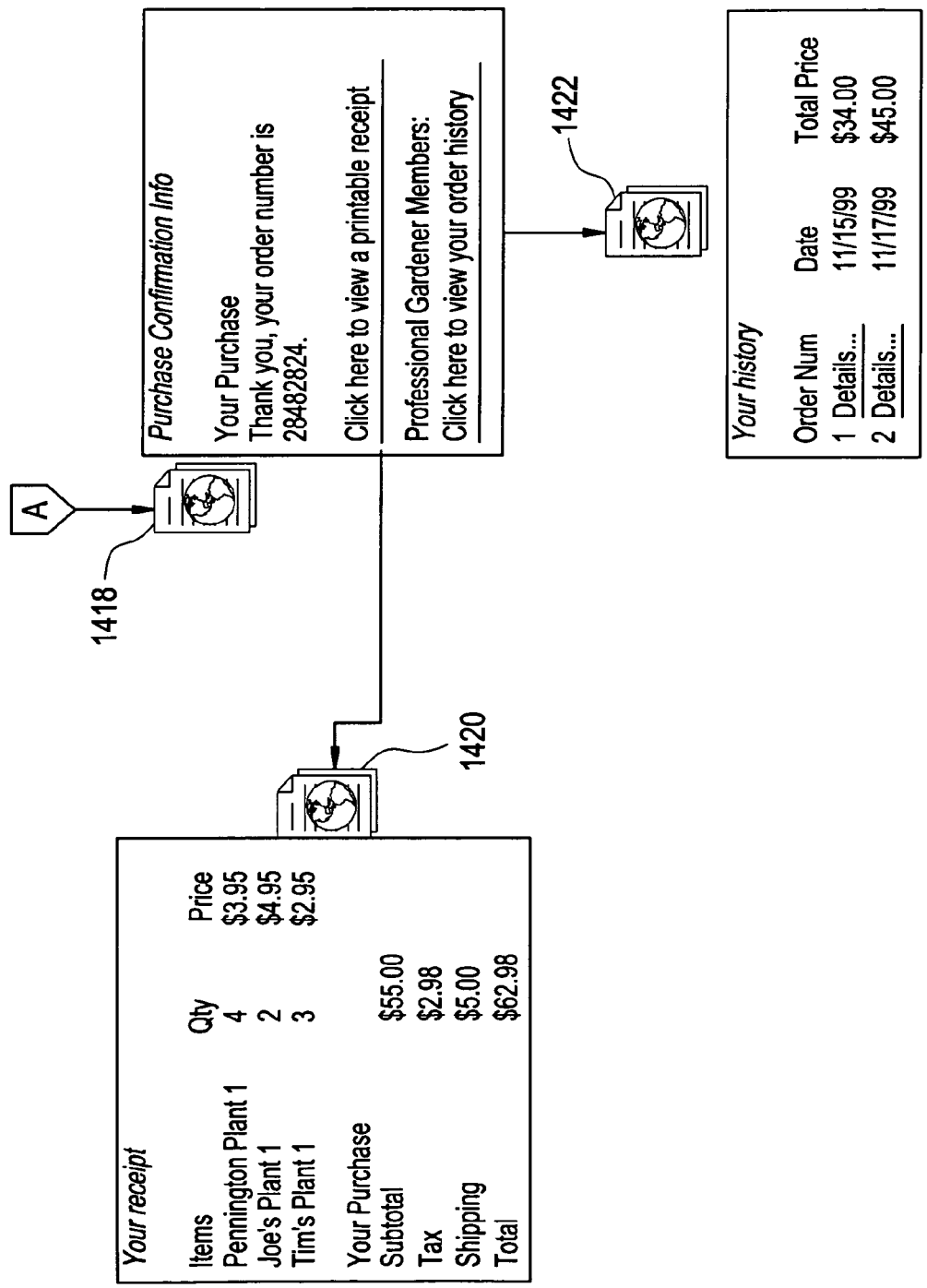

In that case, in the step 931 the gardening Web site transmits a "Product List" Web page to the user including a list of products which the user may order. Such products may include, for example, seeds, cuttings, potted plants, etc. Preferably, via hypertext links on the "Product List" Web page, the user may select a product for purchase, in which case the process continues at a step 1405 (shown in FIGS. 14A–14B) of the product purchasing checkout process 1400 as described in more detail below.

In the step 1102, the gardening Web site transmits a "How-to Guide" home page to the user.

Through the "How-to Guide" home page, the user may obtain information, including advice, instructions, tools, products, etc. about planting, maintaining, harvesting, or cooking the plant of interest. The "How-to Guide" home page informs the user about the categories of gardening advice available. Then, in a step 1104, the user clicks a "submit" button to submit his/her request for gardening advice.

Next, in a step 1106, the gardening Web site transmits a "Your Plant's How-to Guide" Web page to the user, listing specific categories of gardening information available to the user. In a preferred embodiment, the user may select information regarding planting, maintaining, harvesting, or cooking the plant of interest. The user may select any of these options by clicking on a corresponding button on the "How-to Guide" home page.

If the user selects cooking, then in a step 1110, the gardening Web site transmits a "Cooking" Web page to the user. The "Cooking" Web page includes a list of recipes for preparing foods using the particular plant of interest (e.g., a vegetable, fruit, nut, berry, etc.).

Then, in a step 1110, the user may select one of the recipes in the list. In that case, in a step 1112, the gardening Web site transmits a "Recipe" Web page to the user.

If the user selects planting, then in a step 1116, the gardening Web site transmits a "Planting" Web page to the user.

Preferably, the "Planting" Web page includes a description of planting options for the particular plant of interest. Planting options may include seeds, bare roots, bulbs, potted plants, etc.

If the user wants to view a list of products for growing and maintaining an identified plant of interest, then in a step 1118, the user selects a "View Purchase Options" button associated with the plant of interest. Alternatively, if the user wants to view a list of tools for planting an identified plant of interest, then in a step 1120, the user selects a "Tools" button associated with the plant of interest.

If the user selects the "View Purchase Options" button in the step 1118, or the "Tools" button in the step 1120, then in a step 1122, the gardening Web site selects an appropriate product list to match the identified plant of interest and the selection made by the user. Then, in a step 1124, the gardening Web site transmits a corresponding "Product List" Web page to the user. For example, if the user has selected the "View Purchase Options" button in the step 1118, then the "Product List" Web page may include a list of agricultural and gardening products that apply to the plant of interest. Such products may include, for example, seeds, cutting, potted plants, fertilizers, pesticides, etc. Preferably, via hypertext links on the "Product List" Web page, the user may select a product for purchase, in which case the process continues at a step 1405 (shown in FIGS. 14A–14B) of the product purchasing checkout process 1400 as described in more detail below.

If the user selects harvesting, then in a step 1128, the gardening Web site transmits a "Harvesting" Web page to the user. The "Harvesting" Web page includes information about harvesting the particular plant of interest. Preferably, the "Harvesting" Web page also includes a "Tools" button associated with harvesting the plant of interest. If the user selects the "Tools" button in a step 1130, then in the step 1122, the gardening Web site selects an appropriate product list of tools for harvesting the identified plant of interest as described above.

If the user selects maintaining, then in a step 1134, the gardening Web site transmits a "Maintaining" Web page to the user. Preferably, the "Maintaining" Web page includes hypertext buttons for Web pages with information on watering, fertilizing, pruning, and controlling pests for the particular plant of interest. Also preferably, the user may click on one or more "Tools" buttons associated with the maintenance choices presented to the user. If the user selects the "Tools" button in a step 1136, then in the step 1122, the gardening Web site selects an appropriate product list to match the identified plant of interest as described above.

If the user wants more information on fertilizing the particular plant of interest, then in a step 1142, the user clicks on the hypertext button for a "Fertilizing" Web page. In that case, in a step 1144, the gardening Web site transmits to the user the "Fertilizing" home page having information about fertilizing the particular plant of interest.

Preferably, the "Fertilizing" home page allows the user to choose a classification for identifying a fertilizer for the particular plant of interest. For example, the user may choose to have fertilizers classified by primary use as premium, economical, controlled release, micronutrient type, etc. Also, the user may choose to have fertilizers classified by application method, such as granular, water soluble, liquid, organic, stakes, etc. Based upon the choices made by the user, the gardening Web site transmits fertilizer Web pages to the user that include lists of various fertilizer products which may be purchased by the user.

Figure 15A:
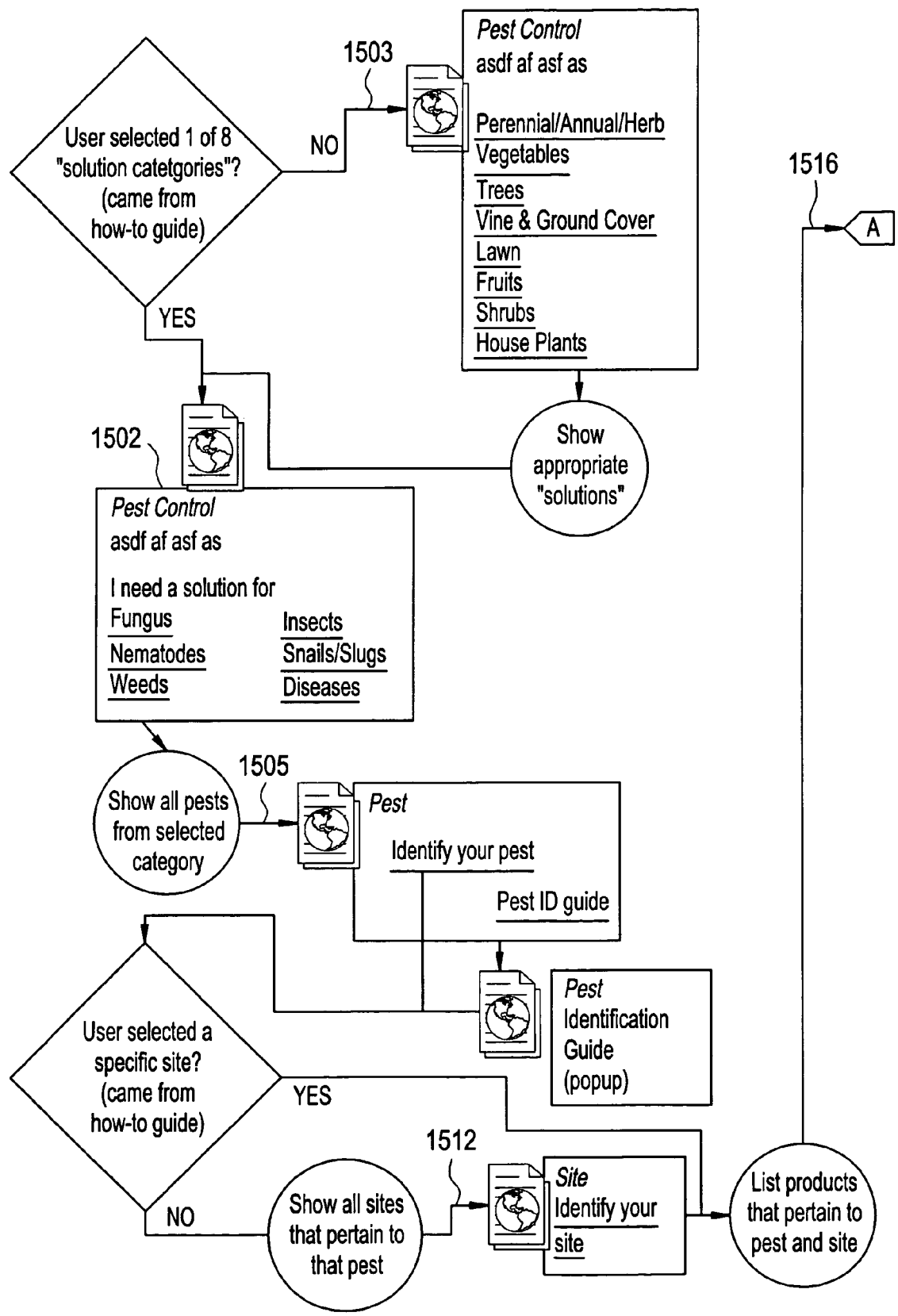
FIGS. 15A–15B illustrate an eighth portion of a flowchart of a second preferred embodiment of a method and system for supplying gardening/agricultural information and/or advice.
Figure 15B:
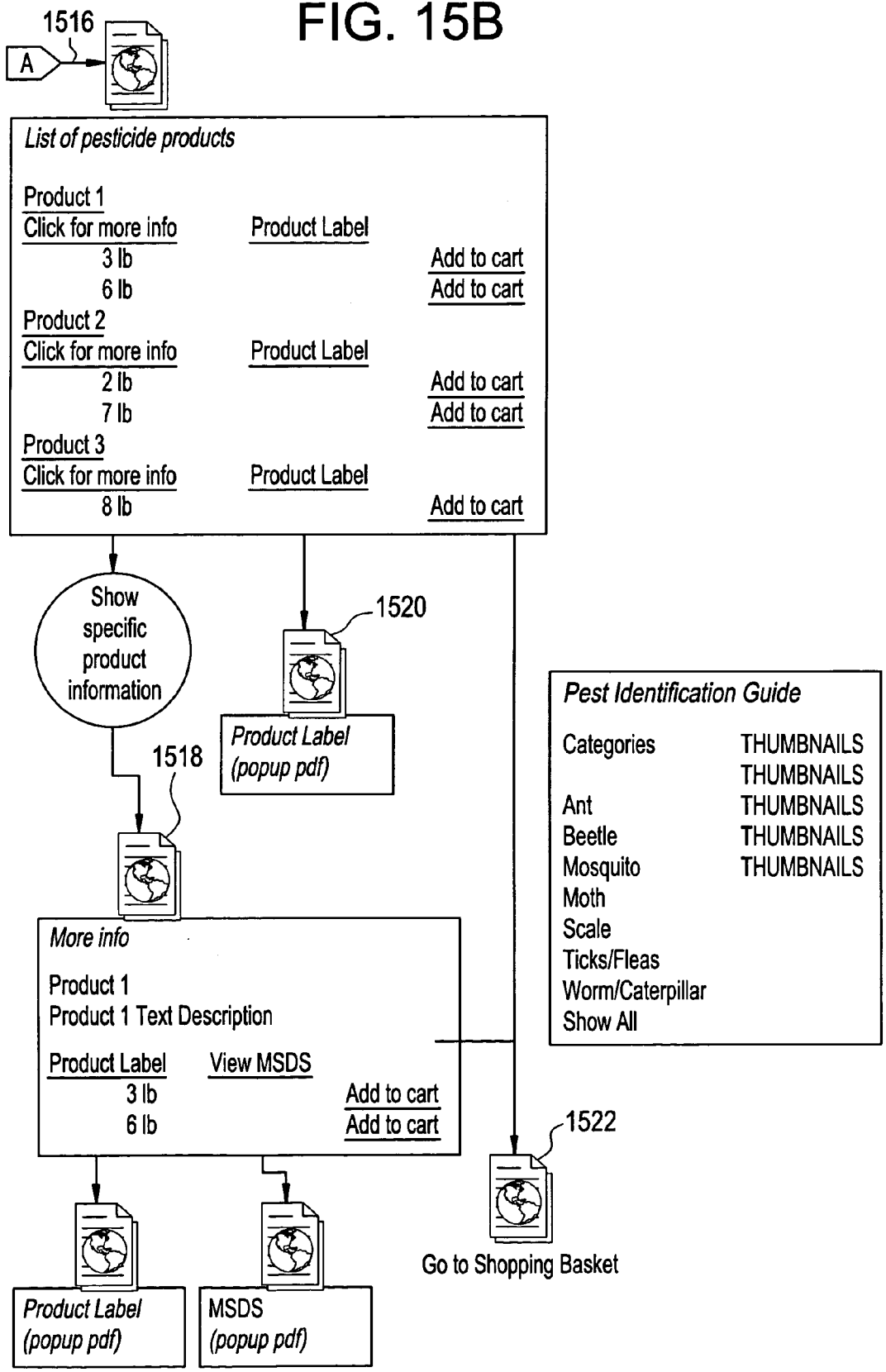
Figure 16:
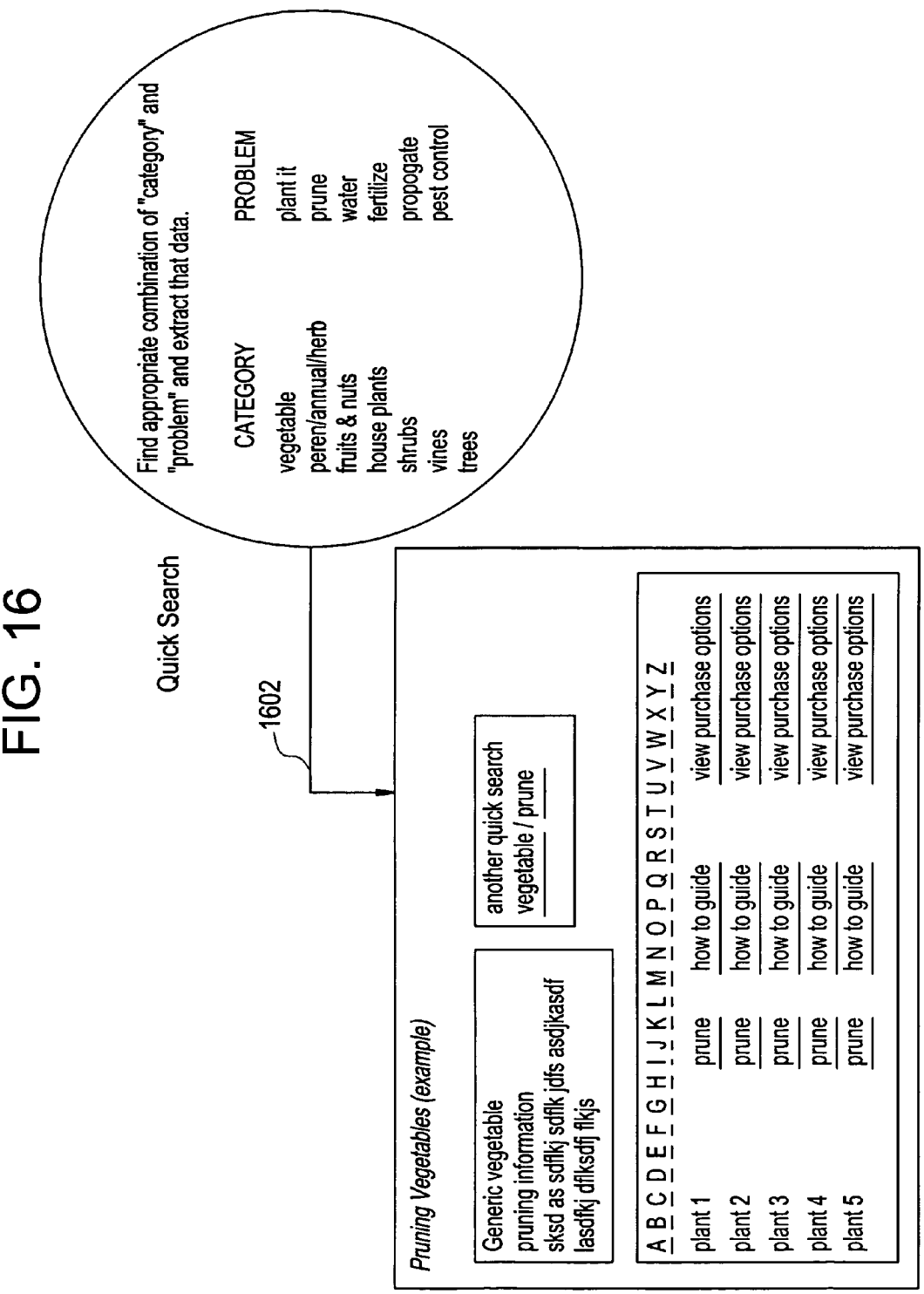
FIG. 16 is an ninth portion of a flowchart of a second preferred embodiment of a method and system for supplying gardening/agricultural information and/or advice.

If, from the "Maintenance Page" the user wants more information on controlling pests for the particular plant of interest, then in a step 1148, the user clicks on the hypertext button for a "Pest Control" home page. In that case, in a step 1503 (shown in FIGS. 15A–15B), the gardening Web site transmits a "Pest Type Selection" Web page to the user, as described in more detail below.

Figure 12A:
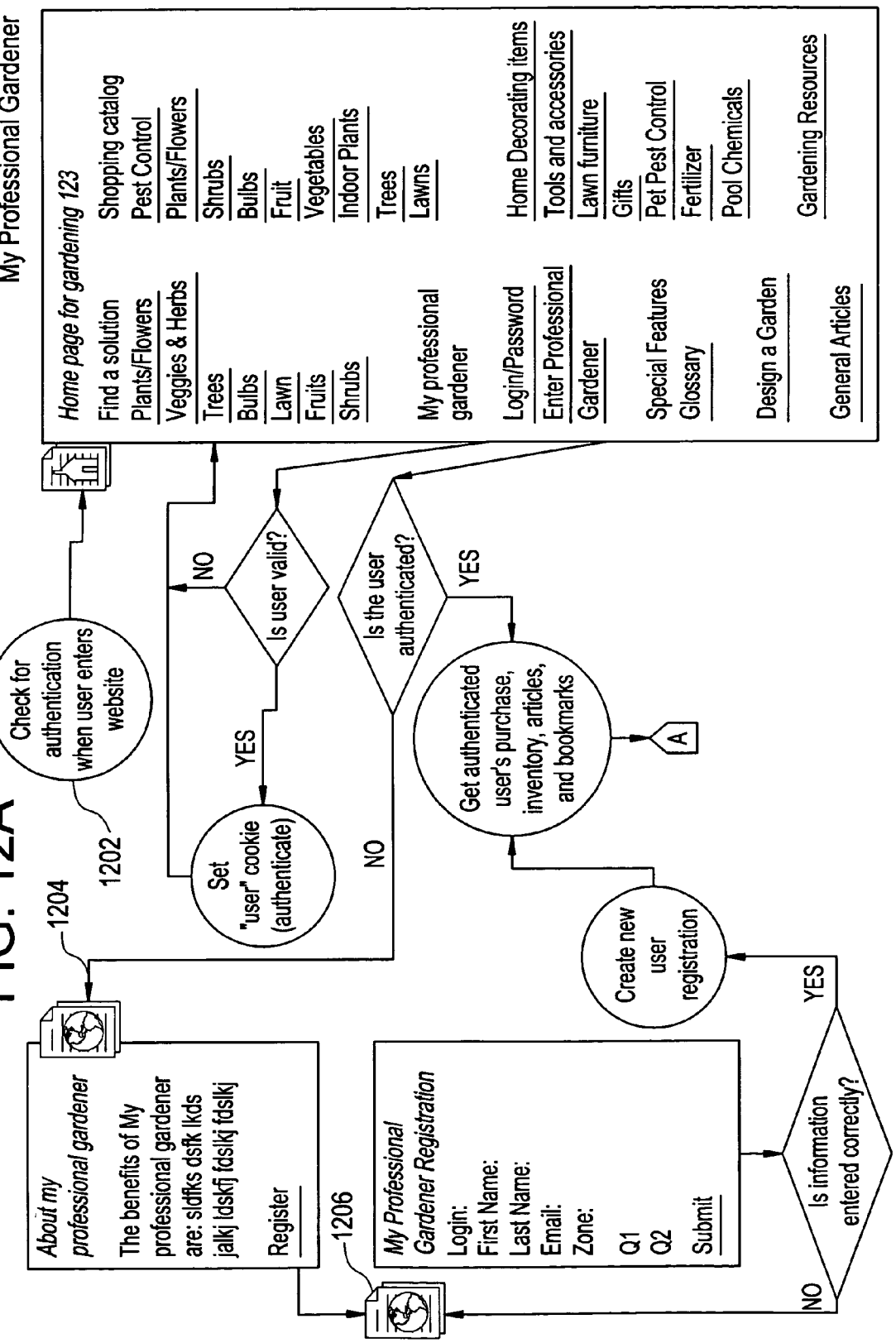
FIGS. 12A–12B illustrate a fifth portion of a flowchart of a second preferred embodiment of a method and system for supplying gardening/agricultural information and/or advice.
Figure 12B:
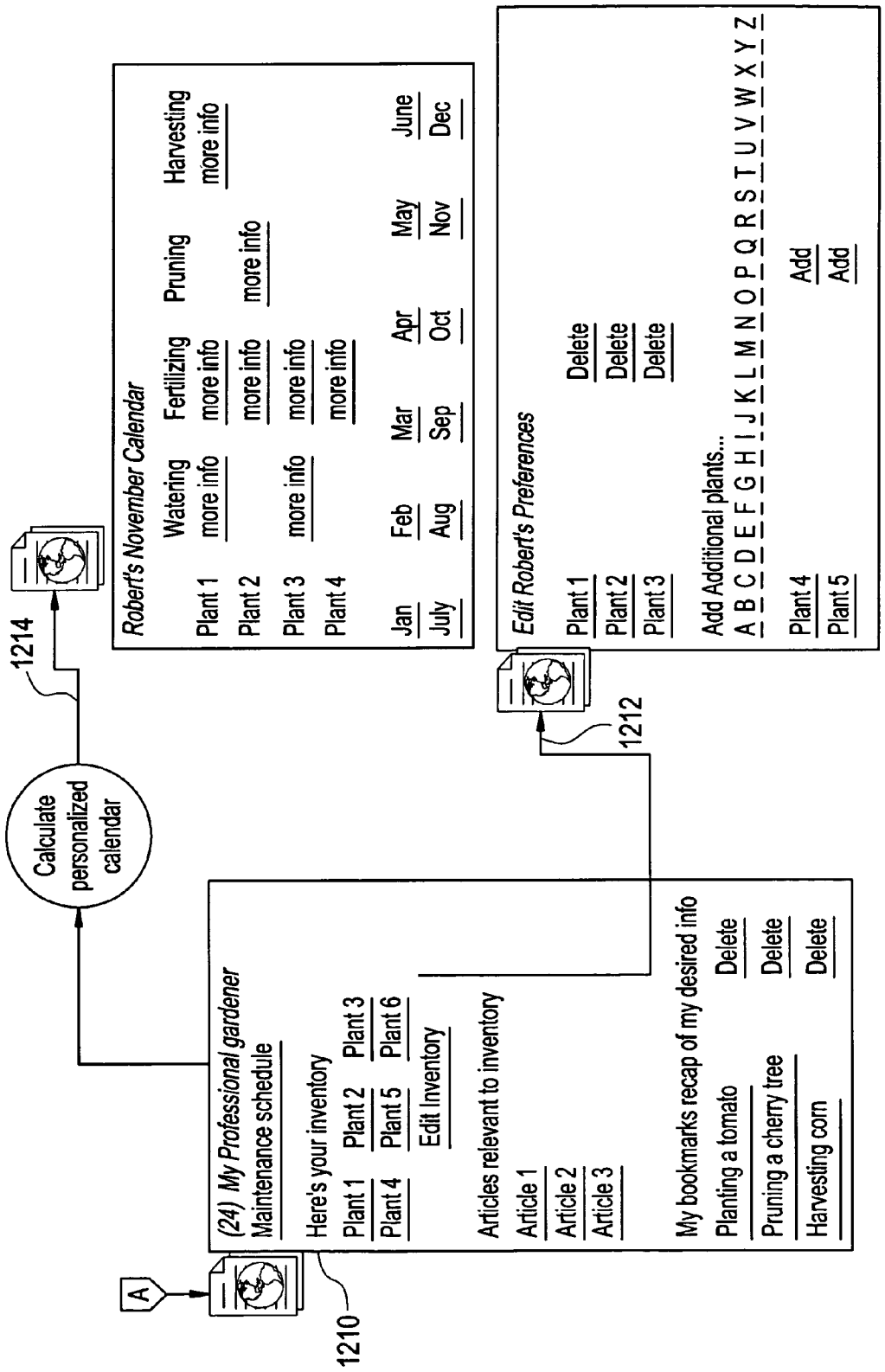

If in the step 810 the user indicates that he/she wants professional gardening advice, then he/she will proceed to the professional gardening advice process. FIGS. 12A–12B show a second preferred embodiment of a flowchart for the professional gardening advice process 1200.

In that case, in a step 1202, the gardening Web site checks to see whether the user has been authenticated.

If the user is a new user, the gardening Web site will determine that the user has not been authenticated, and in a step 1204 transmits a "Registration" Web page to the user. Preferably, the Registration page includes information about the gardening Web site's professional gardening advice service and a hypertext "Registration" button for the user to click to start a registration process.

When the user selects the registration process, then in a step 1206, the gardening Web site transmits to the user a "Registration Info" Web page for the user to enter pertinent registration information, such as a name, password, e-mail address, etc. Preferably, the registration information may be obtained over a secure Web connection, in which case the user may also provide credit card and shipping information for any products which the user may order through the gardening Web site. After entering the registration information, the user clicks on a hypertext button to submit the information to the gardening Web site.

Upon receiving the new user registration information, in a step 1210 the gardening Web site transmits to the user a "My Professional Gardener" home page.

Preferably, the "My Professional Gardener" home page includes hyperlink buttons to allow a user to enter or review information regarding plant life on the user's property, to review a maintenance plan for the plant life on the user's property, or to review general gardening or agricultural articles of interest.

If the user wants to enter or review information describing plant life on the user's property, then the user selects an "Edit Inventory" button and in a step 1212, the gardening Web site transmits to the user an "Inventory" home page.

Through the "Inventory" home page, the user can may be presented with a list of the user's properties, may select a property, and may enter data pertaining to the user's property, including for example, a property name or descriptor and a geographical region where the property is located. The process of identifying a geographical region may be performed according to any process described in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson.

Also, the user may create an inventory of the desirable and undesirable plant life on the user's property. Weeds are one example of an undesirable plant life. Plants may be identified and entered into the inventory in a variety of ways, including preferably through the plant finder/solution finder process 900 described above. As the user adds new plants to his/her property, they may be added to the inventory through the "My Report" home page.

Optionally, the user also may specify other information, such as the user's outdoor pets, or particular pests that are prevalent on the user's property that impact the plant life. All of this information may be used by the gardening Web site to develop a maintenance plan which is optimal for the user's property.

After entering the property data, the plant life inventory, and other information, the user may submit the data to the gardening Web site. This data is then retained in a user plant life database at the gardening Web site. Plant life data also may be added/deleted from the plant life inventory.

Based upon the user's plant life and property data, the gardening Web site then automatically constructs a recommended maintenance plan for the user's property. The maintenance plan can include a schedule of maintenance for each different plant on the user's property, together with recommended gardening and agricultural materials, such as fertilizers, pesticides, weed killers, etc. and, optionally, a pruning schedule, as appropriate. Preferably, specific instructions are supplied to the user in a timely fashion as to when and how to apply various gardening materials, as well as exactly which gardening materials should be applied, to the various types of plant life on the user's property. If the user so chooses, recommended gardening materials may be automatically sent to the user in a timely fashion according to the maintenance plan, and a user-designated account (e.g., credit card) may be automatically debited accordingly.

The maintenance plan is then be stored at the gardening Web site and may be viewed by the user as described below with respect to step 1214. Either supplementally or alternatively, the maintenance plan may be communicated to the user via one or more e-mail messages. For example, the user may receive a periodic (e.g., weekly, monthly, daily) e-mail message indicating all of the recommended maintenance for the user's property for that period. Also, reminders may be provided to the user within a few days or a week of when a gardening material should be applied. The method of communicating the maintenance plan information to the user may be selected by the gardening Web site or by the user.

Preferably, the recommended gardening and agricultural materials are selected based upon the region where the property is located. For example, the gardening Web site would not recommend pesticides or weed killers that are not licenses for use in the state where the property is located.

In a particularly preferred embodiment, the recommended gardening and agricultural materials for each plant are selected taking into account other plants, pests, and user pets that are located on the user's property. For example, certain products that may be effective in killing undesirable weeds in the grass lawn of the user's property may also be detrimental to desirable shrubs and flowers located on the property, or may be harmful to the user's pets. In that case, preferably the gardening Web site will construct a maintenance plan which selects alternative products which are safe for the user's pets and the desirable plants on the property, or, alternatively, advises the user of the possible dangers and suggests proper precautions.

Preferably, the gardening Web site automatically modifies the recommended maintenance plan for the user's property as new information becomes available. Preferably, as maintenance is performed on the property, preferably the user may submit the maintenance information to the gardening Web site. So, for example, if certain gardening or agricultural materials are more effective if their use is rotated in conjunction with other materials, the gardening Web site's algorithms can recognize that fact and modify the user's maintenance plan accordingly. Also, if a new weed-killer becomes licensed in the user's state, the gardening Web site's maintenance plan development algorithm can automatically determine whether this product should be substituted for a product or products in the previous maintenance plan. Or, for another example, if the user updates the user's information in "My Report" to note the presence of weeds or pests not previously present, the maintenance plan algorithm may modify the recommended maintenance plan accordingly. Preferably, the gardening Web site may update the user's maintenance plan in real time. The important thing to note is that in the second preferred embodiment, the algorithm for determining the maintenance plan for the user's property may be adaptable and may in fact "learn" from previous history and results for the plant life on the user's property, and indeed, even other similar properties whose information is stored at the gardening Web site.

If at the "My Professional Gardener" home page the user wants to review a maintenance plan for the plant life on the user's property, then the user selects a "Maintenance Schedule" button and in a step 1214, the gardening Web site transmits to the user a "My Personal Calendar" home page. Through the "My Personal Calendar" home page, the user may view a recommended maintenance plan for the entire property, or for an individual plant. The recommended maintenance plan preferably includes a recommended maintenance schedule (e.g., dates and best time of day) for performing the maintenance, and may also include a list of one or more recommended products, such as tools, gardening and agricultural materials, etc., for performing the recommended maintenance.

If at the "My Professional Gardener" home page the user wants to review gardening or agricultural articles of interest, then the user selects an "Articles" button and in that case the gardening Web site transmits to the user gardening or agricultural articles relevant to the user's plant life inventory.

Figure 13A:
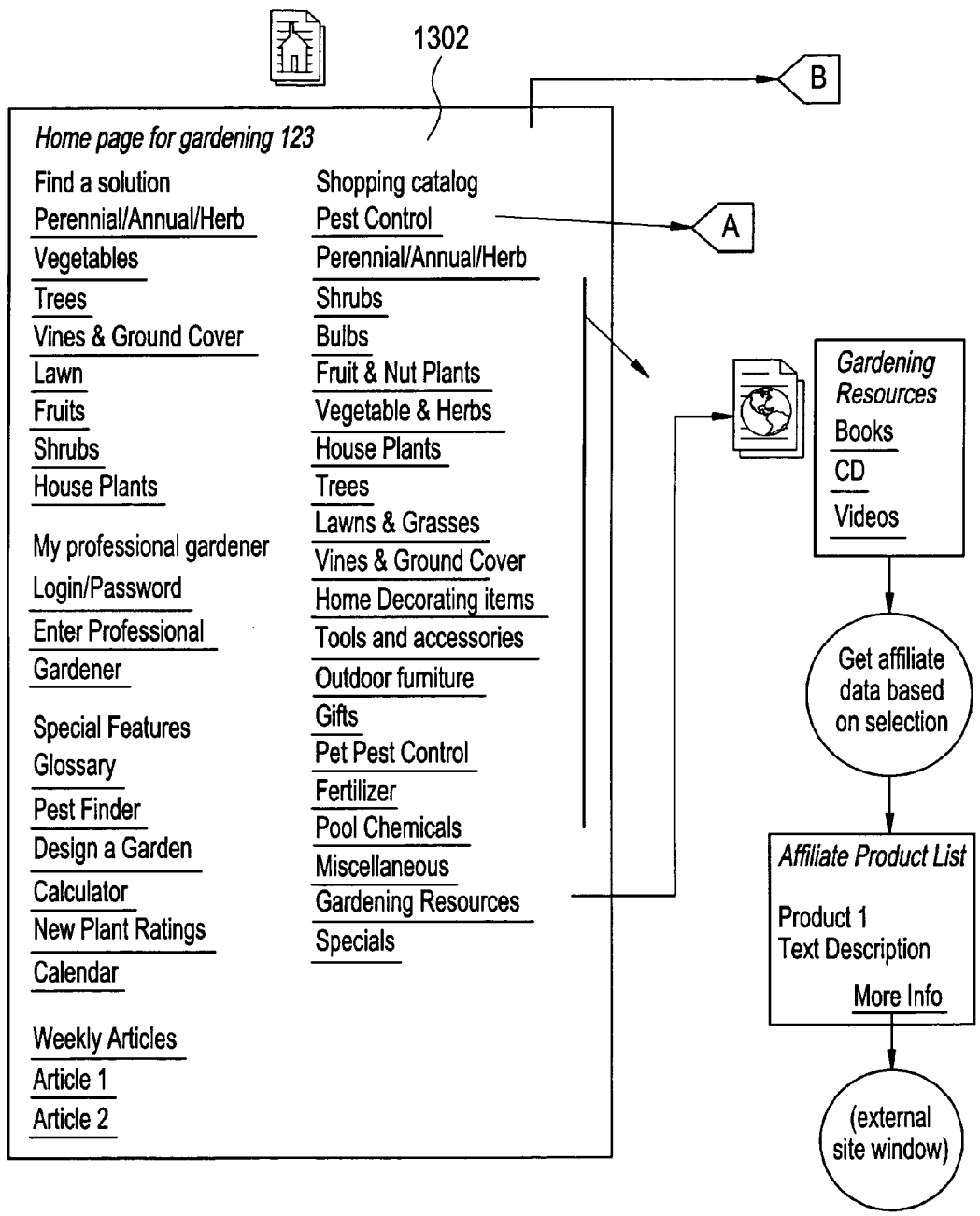
FIGS. 13A–13B illustrate a sixth portion of a flowchart of a second preferred embodiment of a method and system for supplying gardening/agricultural information and/or advice.
Figure 13B:
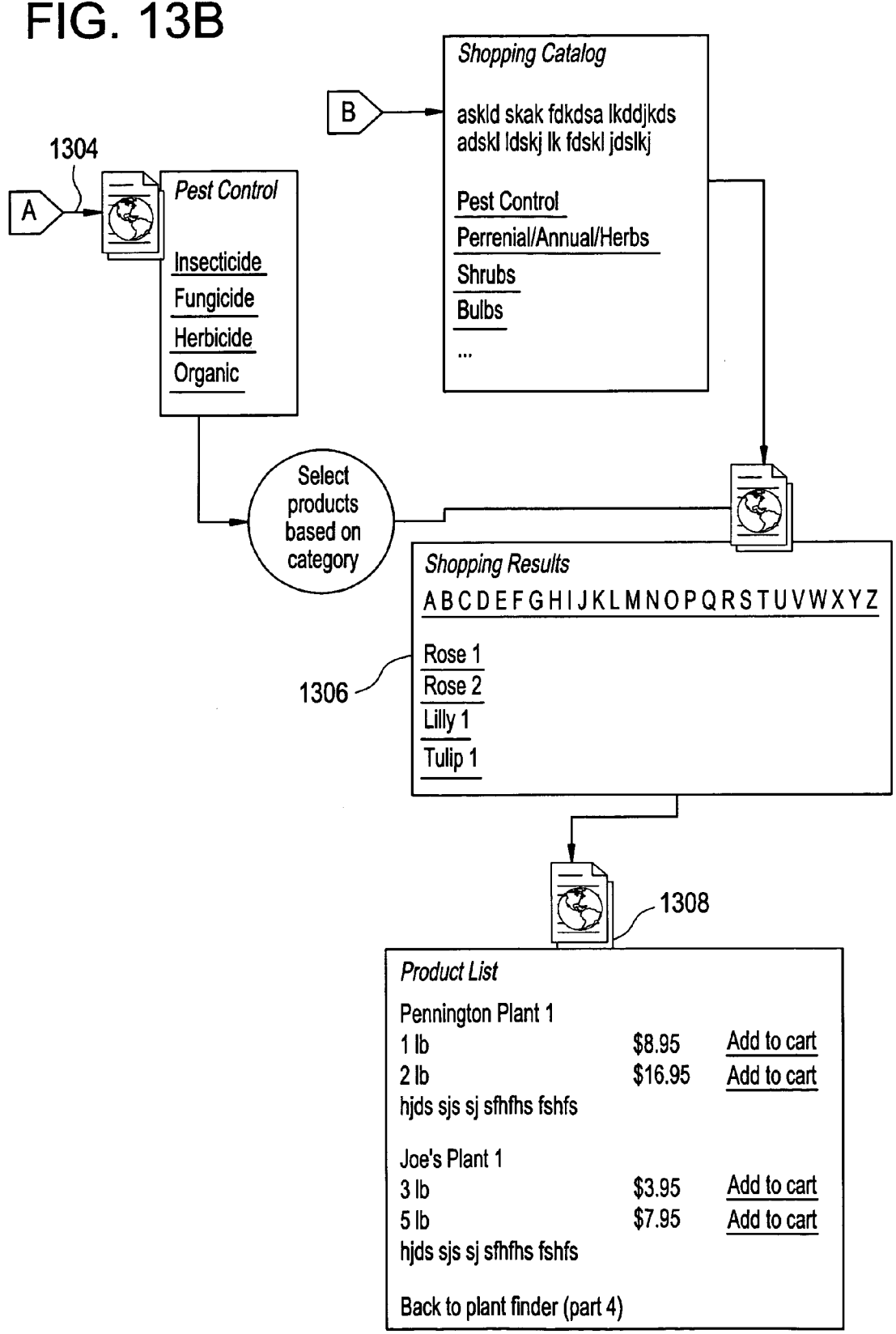

If in the step 810 the user indicates that he/she wants to purchase a gardening or agricultural product, then he/she will proceed to the product purchasing process. FIGS. 13A–13B show a second preferred embodiment of a flowchart for the product purchasing process 1300. The user may enter the product purchasing process 1300 by selecting a "Shopping Catalog" button on the gardening Web site home Web page, or by selecting a particular product category from the gardening Web site home Web page.

In a step 1302, the user selects from a list of available catalogs of products on the gardening Web site home page. Then, in a step 1304, the gardening Web site sends to the user a corresponding alphabetized product catalog home page through which the user may identify and select one or more items to be ordered by the user. In a step 1306, the user selects an item for purchase. Then, in a step 1308, the gardening Web site sends to the user a "Product List" Web page whereby the user may select one or more products for purchase. Preferably, via hypertext links on the "Product List" Web page, the user may select a product for purchase, in which case the process continues at a step 1405 (shown in FIGS. 14A–14B) of a product purchasing checkout process 1400.

In the step 1405, the gardening Web site transmits to the user a "Shopping Basket" Web page indicating all of the products which the user has selected for purchase. From the "Shopping Basket" Web page, the user may return to a previous process, such as the plant finder/solution finder process, the professional gardening advice process, or the garden designer process, or continue adding products through the product purchasing process. Alternatively, in a step 1412, the user may indicate that he/she is ready to checkout and purchase the selected products.

In that case, in a step 1414, the gardening Web site transmits to the user a "Shipping Information" Web page whereby the user supplies information where the products are to be shipped. Preferably, the gardening Web site establishes a secure connection with the user for communicating the purchase information, such as shipping details and credit card account numbers. Alternatively, as described earlier, the user may supply this information during the user registration process.

After the user has supplied the shipping information, in a step 1416 the gardening Web site transmits to the user a "Payment Information" Web page whereby the Web site provides a total price, including shipping, for the selected products, and whereby the user supplies payment information, such as a credit card type, account number and expiration date.

At this point, the user may cancel the order and return to the "Shopping Basket" Web page at the step 1405. Alternatively, the user may change the shipping information and return to the "Shipping Information" Web page at the step 1414.

If the user is satisfied with the order, then the user may place the order and, then in a step 1418, the gardening Web site will send to the user a "Purchase Confirmation" Web page. From the "Purchase Confirmation" Web page, the user may request a receipt for the order. In that case, in a step 1420, the gardening Web site will send to the user a receipt, preferably a printable receipt. Also, the user may request a history of all previous orders placed by the user. In that case, in a step 1422, the gardening Web site will send to the user a "Purchase History" Web page listing all of the user's purchases.

If in the step 810 the user indicates that he/she wants pest control information, then in a step 1502, the gardening Web site transmits to the user a "Pest Control" home Web page. From the "Pest Control" home Web page, the user may select a type of plant for which the desired pest control solution is sought. After the user selects the desired plant type, then in a step 1505, the gardening Web site transmits to the user a "Pest ID" Web page whereby the user may identify a pest which the user desires to control. Preferably, the "Pest ID" Web page includes a popup guide to help the user identify the pest. Optionally, in a step 1512, the gardening Web site may transmit a "Pest Site" Web page whereby the user identifies a site where the identified pest is located.

In a step 1516, the gardening Web site transmits a "Pesticide Products" Web page to the user. The "Pesticide Products" Web page includes a list of products for controlling the identified pest From the "Pesticide Products" Web page, the user may select a product to receive a Web page with specific product information (step 1518), may view a product's label (step 1520), or may add a product to his/her shopping cart (step 1522) and proceed to the shopping checkout process at the step 1405.

If in the step 810 the user indicates that he/she wants perform a quick search, then in a step 1602, the gardening Web site transmits a "Quick Search" Web page to the user. Through the "Quick Search" Web page, the user may identify a particular type of plant and a problem (e.g., planting, pruning, fertilizing, controlling pests, etc.) for which the user wishes to receive advice. In response, in a step 1604, the gardening Web site transmits an alphabetized "Quick Search Results" Web page to the user. There, the user may select a specific plant, and click on associated hypertext links to allow the user to receive the desired advice, or to purchase a product.

In addition to the specific processes described above with respect to the flowcharts of FIGS. 1–16, the gardening Web site may provide some or all of the features disclosed in U.S. patent application Ser. No. 09/373,576 entitled "GARDEN AND AGRICULTURAL MATERIAL IDENTIFICATION METHOD AND APPARATUS," filed on Aug. 13, 1999 in the names of J. Keith Kelly and Peter Stuart Edmondson.

While preferred embodiments are disclosed herein, many variations are possible which remain within the concept and scope of the invention. For example, although the preferred embodiment has been described with respect to an implementation via a computer network (i.e., the Internet), the process could run as standalone computer program. In that case, the process would be entirely executed and all information would be stored locally on a user's computer. Such variations would become clear to one of ordinary skill in the art after inspection of the specification, drawings and claims herein. The invention therefore is not to be restricted except within the spirit and scope of the appended claims.

What is claimed is:

1. A method of providing agricultural information, comprising:
   inputting into a computer, a geographical region in which a user's property is located;
   inputting into the computer, an inventory of plants existing on the user's property;
   executing an algorithm for generating instructions for performing maintenance activities for the plants based on the received geographical region and inventory of plants; and
   periodically communicating the generated instructions to the user, wherein each periodic communication includes instructions for performing maintenance activities for the plants for a predetermined period.

2. The method of claim 1, wherein the instructions include a schedule for performing said maintenance activities.

3. The method of claim 1, wherein the instructions include at least one gardening material to be applied to the property.

4. The method of claim 3, further comprising shipping the gardening material to the user.

5. The method of claim 3, wherein the instructions include a maintenance schedule for applying the gardening material.

6. The method of claim 5, further comprising scheduling a shipment of the gardening material to the user in accordance with the maintenance schedule.

7. The method of claim 1, wherein the algorithm generates the instructions for performing maintenance activities for said plants based upon the geographical region.

* * * * *